(12) United States Patent
Konagai et al.

(10) Patent No.: US 11,021,583 B2
(45) Date of Patent: *Jun. 1, 2021

(54) RANDOM MAT AND FIBER-REINFORCED COMPOSITE MATERIAL

(71) Applicant: Teijin Limited, Osaka (JP)

(72) Inventors: Yuhei Konagai, Matsuyama (JP); Katsuyuki Hagihara, Matsuyama (JP); Takeshi Naito, Osaka (JP); Naoaki Sonoda, Osaka (JP)

(73) Assignee: Teijin Limited, Osaka (JP)

( * ) Notice: Subject to any disclaimer, the term of this patent is extended or adjusted under 35 U.S.C. 154(b) by 607 days.

This patent is subject to a terminal disclaimer.

(21) Appl. No.: 15/901,140

(22) Filed: Feb. 21, 2018

(65) Prior Publication Data

US 2018/0244875 A1  Aug. 30, 2018

Related U.S. Application Data

(63) Continuation of application No. 14/375,961, filed as application No. PCT/JP2013/052264 on Jan. 31, 2013, now abandoned.

(30) Foreign Application Priority Data

Jan. 31, 2012 (JP) .................. 2012-018076
Jul. 26, 2012 (JP) .................. 2012-165872

(51) Int. Cl.
*B29C 70/12* (2006.01)
*C08J 5/04* (2006.01)
*D04H 1/4242* (2012.01)

(52) U.S. Cl.
CPC ............. *C08J 5/042* (2013.01); *B29C 70/12* (2013.01); *D04H 1/4242* (2013.01); *Y10T 428/268* (2015.01)

(58) Field of Classification Search
CPC ......... B29C 70/12; D04H 1/4242; C08J 5/042
See application file for complete search history.

(56) References Cited

U.S. PATENT DOCUMENTS

| | | | |
|---|---|---|---|
| 4,770,929 A | * | 9/1988 | Nobumasa ............... B32B 5/28 442/278 |
| 6,066,395 A | | 5/2000 | Miyoshi et al. |

(Continued)

FOREIGN PATENT DOCUMENTS

| | | |
|---|---|---|
| EP | 42006 A1 | 12/1981 |
| EP | 483716 B1 | 7/1996 |

(Continued)

OTHER PUBLICATIONS

International Search Report issued in corresponding International Application No. PCT/JP2013/052264 dated May 7, 2013.

(Continued)

*Primary Examiner* — Matthew J Daniels
(74) *Attorney, Agent, or Firm* — Banner & Witcoff, Ltd.

(57) ABSTRACT

There is provided a random mat including carbon fibers and a matrix resin, wherein the carbon fibers in the random mat have an average fiber length in a range of 3 mm to 100 mm, a fiber areal weight of the carbon fibers is 25 to 10,000 g/m$^2$, the carbon fibers include a specific carbon fiber bundles having a specific opening degree in a specific amount per the total carbon fibers, and the specific carbon fiber bundles with a thickness of 100 μm or more are included in a ratio of less than 3% of the number of the total specific carbon fiber bundles.

10 Claims, 5 Drawing Sheets

(56) References Cited

U.S. PATENT DOCUMENTS

| | | | |
|---|---|---|---|
| 8,946,342 B2* | 2/2015 | Konagai | B29C 70/12 |
| | | | 524/495 |
| 2005/0053787 A1 | 3/2005 | Yamasaki et al. | |
| 2009/0004453 A1 | 1/2009 | Murai et al. | |
| 2010/0178495 A1 | 7/2010 | Taketa et al. | |
| 2013/0122262 A1* | 5/2013 | Nagakura | D06M 15/227 |
| | | | 428/172 |
| 2013/0317161 A1 | 11/2013 | Konagai et al. | |
| 2014/0077412 A1 | 3/2014 | Taniguchi et al. | |
| 2014/0079908 A1* | 3/2014 | Kato | B29C 66/21 |
| | | | 428/140 |
| 2014/0080961 A1 | 3/2014 | Konagai et al. | |
| 2014/0178631 A1 | 6/2014 | Taniguchi et al. | |
| 2014/0178653 A1 | 6/2014 | Nagakura et al. | |
| 2014/0186584 A1 | 7/2014 | Arakawa et al. | |

FOREIGN PATENT DOCUMENTS

| | | | | |
|---|---|---|---|---|
| EP | 2716433 | A1 | 4/2014 | |
| JP | 4161409 | B2 | 10/2008 | |
| JP | 2009-114611 | A | 5/2009 | |
| JP | 2009-114612 | A | 5/2009 | |
| JP | 2011-178890 | A | 9/2011 | |
| JP | 2011-178891 | A | 9/2011 | |
| WO | 2007-097436 | A1 | 8/2007 | |
| WO | 2012165418 | A1 | 6/2012 | |
| WO | 2012-105080 | A1 | 8/2012 | |
| WO | WO2012105080 | * | 8/2012 | D04H 1/60 |
| WO | 2013-031860 | A1 | 3/2013 | |
| WO | 2013-035705 | A1 | 3/2013 | |
| WO | 2013031789 | A1 | 3/2013 | |

OTHER PUBLICATIONS

Harper, L.T., Turner, T.A., Warrior, N.A., and Rudd, C.D., "Characterisation of random carbon fibre composites from a directed fibre preforming process: The effect of tow filamentisation," (Composites Part A 38 (2007) 755-770).

Journal of the Japan Society for Composite Materials, vol. 37, No. 4 (2011) 138-146 (along with English translation).

May 13, 2020—(PCT) IPER—App PCT/JP2013/052264—Eng Tran.

Aug. 27, 2015—U.S. Non-final Office Action—U.S. Appl. No. 14/375,961.

Oct. 5, 2015—(EP) Communication Pursuant to Rule 114(2)—App 13744132.5.

Mulligan, D.R., Ogin, S.L., Smith, P.A., Wells, G.M., and Worral, C.M., "Fibre-bundling in a short-fibre composite: 1. Review of literature and development of a method for controlling the degree of bundling" Composite Science and Technology 63 (2003) 715-725.

Harper, L.T., Turner, T.A., Warrior, N.A., Dahl, J.S., and Rudd, C.D., "Characterisation of random carbon fibre composites from a directed fibre preforming process: Analysis of microstructural parameters," Composites: Part A 37 (2006) 2136-2147.

Nov. 6, 2015—(CN) Office Action—App 201380007589.1—Eng Tran.

Feb. 1, 2016—U.S.—Final Office Action—U.S. Appl. No. 14/375,961.

Harper, Lee T., Turner, Thomas A., and Warrior, Nicholas A., "A Random Fibre Network Model for Predicting the Stochastic Effects of Discontinuous Fibre Composites," 16th International Conference on Composite Materials, 10 pages, 3rd party observation in EP case identified publication date as Jul. 13, 2007.

Aug. 25, 2016—(EP) Third party observation—App 20130744132.

Konagai et al., JP 2011-241338, English Machine Translation, translated Dec. 6, 2016.

Murayama et al., JP 2006-291377, English Machine Translation, translated Dec. 6, 2016.

Apr. 21, 2017—U.S. Non-Final Office Action—U.S. Appl. No. 14/375,961.

Aug. 24, 2017—U.S. Final Office Action—U.S. Appl. No. 14/375,961.

* cited by examiner

RANDOM MAT AND FIBER-REINFORCED COMPOSITE MATERIAL

CROSS REFERENCE TO RELATED APPLICATIONS

This is a continuation of U.S. application Ser. No. 14/375,961, filed Jul. 31, 2014, which is a U.S. National Phase Application under 35 U.S.C. § 371 of International Application No. PCT/JP2013/052264, filed Jan. 31, 2013, which claims priority to Japanese Patent Application No. 2012-018076, filed Jan. 31, 2012, and Japanese Patent Application No. 2012-165872, filed on Jul. 26, 2012, which were published Under PCT Article 21(2), the entire contents of which are incorporated herein by reference.

TECHNICAL FILED

The present invention relates to a random mat used as a preform of a fiber-reinforced composite material shaped product and a fiber-reinforced composite material obtained from the random mat.

BACKGROUND ART

Fiber-reinforced composite material including carbon fibers, aramid fibers, glass fibers or the like as a reinforcing fiber has been widely used in a structural material of airplanes, automobiles and the like, general industries and sport applications such as tennis racket, golf shaft, fishing rod, and the like, utilizing high specific strength and specific modulus thereof. A form of the reinforcing fiber used in those includes woven fabrics obtained using a continuous fiber, UD sheets in which fibers are aligned in one direction, random mats prepared using cut fibers, nonwoven fabrics, and the like.

A method of using UD sheet or woven fabric that is a continuous fiber is generally known as a means for obtaining a shape product having high strength. However, from anisotropy of a fiber, the UD sheet or woven fabric is layered in various angles like, for example, 0°/+45°/−45°/90°, and further to prevent warpage of the shaped product, the UD sheet or woven fabric is layered in plane symmetry. This makes a layering step complicated, and was one of causes of increasing the cost of a fiber-reinforced composite material.

Using a random mat that is isotropic in advance is general as a method of simplifying a layering step. The random mat can be obtained by a spray up method (dry method) of spraying cut reinforcing fibers alone or together with a thermosetting resin to a mold, a paper-making method (wet method) of adding reinforcing fibers cut in advance to a slurry containing a binder and conducting paper-making, or the like.

However, in the case of using a random mat, because fibers are discontinuous, mechanical properties of a composite material are low as compared with the case of using a continuous fiber, due to a factor such that fibers are pulled out from a matrix resin, and in particular, it has been difficult to obtain a composite material having high tensile strength. Increasing a fiber volume content (Vf) is known as a means for improving tensile strength of a composite material. However, in the case of using a random mat including cut fibers, due to presence of fibers in a three-dimensional direction and a large number of entanglements of fibers, it has been difficult to increase the fiber volume content.

Non-Patent Document 1 describes a composite material made from a random mat of carbon fibers in which a thermosetting resin is a matrix. However, tensile strength of the composite material is about 230 MPa. Patent Documents 1 and 2 propose a method of using chopped fiber bundles in which fiber bundles are obliquely cut to vary a cross-section as a means for improving mechanical properties of a composite material including a random mat. The method makes possible to improve tensile strength up to about 350 MPa by obtaining a shaped product having high fiber volume content (Vf).

In the case of using a thermosetting resin as a matrix, a fiber-reinforced composite material is generally obtained by heating and pressurizing a material called a prepreg obtained by impregnating, in advance, a fiber-reinforced base material with a thermosetting resin for 2 hours or more using an autoclave. In recent years, an RTM method in which a fiber-reinforced base material that is not impregnated with a resin is set in a mold and a thermoplastic resin is then poured has been proposed, and a molding time was greatly shortened. However, even in the case of using the RTM method, 10 minutes or longer is generally required until molding one part.

For this reason, a composite including a thermoplastic resin as a matrix has been attracted attention in place of the conventional thermosetting resin.

Non-Patent Document 2 proposes a stampable sheet obtained by homogeneously dispersing carbon fibers in a dispersion, obtaining an isotropic sheet, using the carbon fibers in a single fiber form, by a paper-making method, and impregnating the sheet with polypropylene that is a thermoplastic resin as a matrix. According to this method, tensile strength of a composite material is improved by optimizing a fiber length, and the value thereof is about 270 MPa.

Thermoplastic stamping molding (TP-SMC) using a thermoplastic resin as a matrix (Patent Document 3) is a method in which chopped fibers impregnated, in advance, with a thermoplastic resin are heated to its melting point or higher, the heated mixture is charged into a part in a mold, the mold is immediately clamped, and the fibers and the resin are fluidized in the mold to obtain a product shape, followed by cooling and molding. This method can perform molding in a short period of time of about 1 minute by using fibers impregnated, in advance, with a resin. This method is a method of using a molding material called a SMC or a stampable sheet. In such a thermoplastic stamping molding, fibers and a resin are fluidized in a mold, and therefore, there have been problems that a thin-walled product cannot be produced, fiber orientation is disturbed, making it difficult to control, and the like.

Patent Document 4 proposes to prevent that a resin-rich portion occurs in spaces between fiber bundles and a resin cannot impregnate in fiber bundles to form unimpregnated portion, by uniformly dispersing constituent carbon fibers in a single fiber form, as a means for improving isotropy and mechanical characteristics in a fiber-reinforced composite material containing a thermoplastic resin. However, in this conventional technology, there have been problems that because fibers are completely dispersed in a single fiber form, fiber length cannot be lengthened, and where fiber volume content is increased, voids are generated in a shaped product, resulting in deterioration in mechanical characteristics.

PRIOR ART DOCUMENTS

Patent Document

Patent Document 1: JP-A-2009-114611
Patent Document 2: JP-A-2009-114612

Patent Document 3: Japanese Patent No. 4161409
Patent Document 4: WO2007/097436

Non-Patent Document

Non-Patent Document 1: Composites Part A 38 (2007) 755-770
Non-Patent Document 2: Journal of the Japan Society for Composite Materials, Vol. 37, No. 4 (2011) 138-146

SUMMARY OF THE INVENTION

Problems that the Invention is to Solve

Objects of the present invention are to provide a fiber-reinforced composite material that can be produced simply and easily and in low cost and has high fiber volume content and excellent tensile strength, and a random mat containing carbon fibers and a matrix resin, used as a preform thereof.

Means for Solving the Problems

The present inventors have found that to obtain a fiber-reinforced composite material having high fiber volume content and high tensile strength, regarding a random mat as a starting material, the carbon fiber bundles can be impregnated with a resin into the inside thereof by controlling a thickness of carbon fiber bundles, and as a result, tensile strength can be improved, and have reached the present invention.

Specifically, the present invention relates to a random mat including carbon fibers and a matrix resin, wherein the carbon fibers in the random mat have an average fiber length in a range of from 3 mm to 100 mm, a fiber areal weight of the carbon fibers is from 25 to 10,000 g/m$^2$, at least one of fiber bundles including the carbon fibers of less than a critical number of single fiber being defined by the following formula (1) and a single fiber, and carbon fiber bundles (A) constituted by the carbon fibers of the critical number of single fiber or more are present in the random mat, a ratio of the carbon fiber bundles (A) to the total amount of carbon fibers in the random mat is a range of 20 Vol % or more and 99 Vol % or less, an average number (N) of fibers in the carbon fiber bundles (A) satisfies the following formula (2), and a ratio of carbon fiber bundles having a thickness of 100 μm or more of the carbon fiber bundles (A) is less than 3% of the number of whole carbon fiber bundles (A), and a fiber-reinforced composite material obtained by molding the random mat:

$$\text{Critical number of single fiber}=600/D \quad (1)$$

$$0.6\times10^4/D^2<N<1\times10^5/D^2 \quad (2)$$

wherein D is an average fiber diameter (μm) of carbon fibers.

Advantages of the Invention

The random mat of the present invention is preferably used as a preform, and is a random mat having high tensile strength although including a large number of carbon fiber bundles. Furthermore, the fiber-reinforced composite material obtained from the random mat of the present invention has high fiber volume content and high tensile strength, and therefore can be used as various structural members such as an inner plate, an outer plate and a structural member of automobiles, and frames and housings of various electric products and machines.

EMBODIMENTS FOR CARRYING OUT THE INVENTION

Figure 1:
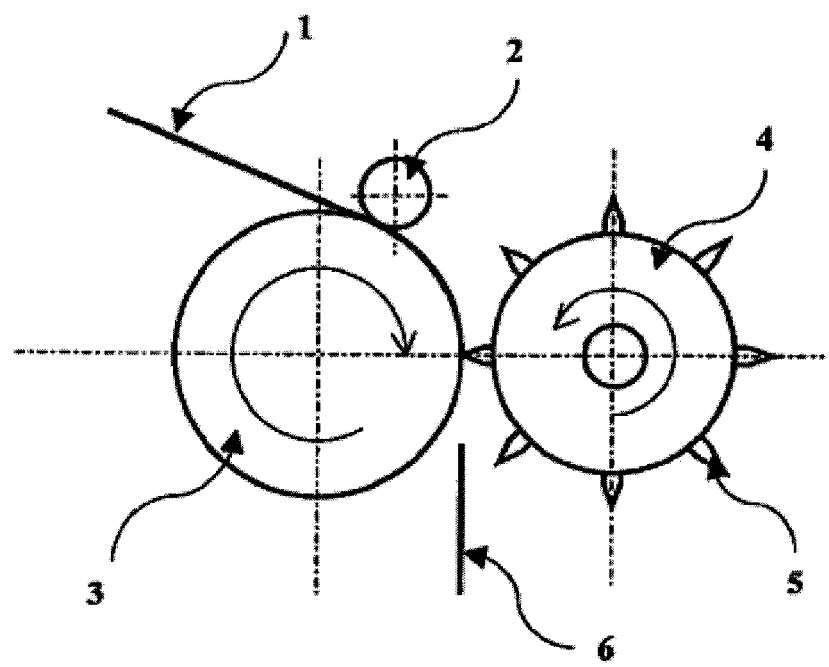
FIG. 1 is a schematic view of a cutting step.

The embodiments of the present invention are sequentially described below.

Random Mat

The random mat of the present invention is a random mat including carbon fibers and a matrix resin.

The carbon fibers constituting the random mat have an average fiber length in a range of from 3 mm to 100 mm. Furthermore, at least one of fiber bundles including the carbon fibers of less than a critical number of single fiber defined by the following formula (1) and a single fiber, and carbon fiber bundles (A) constituted by the carbon fibers of the critical number of single fiber or more are present in the random mat, a ratio of the carbon fiber bundles (A) to the total amount of carbon fibers in the random mat is a range of 20 Vol % or more and 99 Vol % or less, an average number (N) of fibers in the carbon fiber bundles (A) satisfies the following formula (2):

$$\text{Critical number of single fiber}=600/D \quad (1)$$

$$0.6\times10^4/D^2<N<1\times10^5/D^2 \quad (2)$$

wherein D is an average fiber diameter (μm) of carbon fibers.

In in-plane directions of the random mat, the carbon fibers are not aligned in a specific direction, and are arranged by dispersing in randomly directions.

The random mat of the present invention is an in-plane isotropic material. In the case of obtaining a shaped product from the random mat, isotropy of carbon fibers in the random mat is maintained in the shaped product. Isotropy of the random mat and a shaped product obtained from the random mat can be quantitatively evaluated by obtaining a shaped product from the random mat and obtaining a ratio of tensile modulus between two directions perpendicular to each other. When a ratio obtained by dividing the larger value in the values of tensile modulus in two directions in the shaped product obtained from the random mat by the small value thereof does not exceed 2, it is defined to be isotropic. When the ratio does not exceed 1.3, it is defined to be excellent in isotropy.

The random mat of the present invention is constituted by including carbon fibers having a specific average fiber length and a matrix resin, as described above. The random mat may be a mat form of the carbon fibers, i.e., a carbon fiber mat, and the carbon fiber mat may contain a matrix resin. The form in which the carbon fiber mat contains a matrix resin may be a form that a powdery, fibrous or lump matrix resin may be contained in the carbon fiber mat, a form that a sheet-like or film-like matrix resin is mounted or layered on the carbon fiber sheet, and a form that the sheet-like or film-like matrix resin is a molten state. Regarding the carbon fiber mat constituting the random mat of the present invention, it is needless to say that when an average thickness of the carbon fiber bundles (A) constituted by the carbon fibers of the critical number of single fiber or more, the ratio of the carbon fiber bundles (A) to the total amount of the carbon fibers, and the like are obtained, those values can be considered to be values of the random mat.

Carbon fiber areal weight in the random mat is a range of from 25 to 10,000 g/m$^2$ from the standpoints of practicability and moldability, and is preferably from 25 to 4,500 g/m$^2$, more preferably 50 to 4,000 g/m$^2$, and still more preferably 600 to 2,200 g/m$^2$, from the standpoint of fixability of the mat.

The random mat is useful as a prepreg, and various fiber areal weights can be selected depending on desired molding.

Carbon Fibers

The carbon fibers included in the random mat are discontinuous fibers, and can develop reinforcing function by including carbon fibers having a large length to a certain extent. The fiber length is expressed by an average fiber length obtained by measuring fiber lengths of the carbon fibers in the random mat obtained. A method for measuring an average fiber length includes a method of measuring fiber lengths of 100 fibers randomly extracted using a vernier caliper or the like down to a unit of 1 mm, and obtaining its average.

The average fiber length of the carbon fibers in the random mat of the present invention is 3 mm or more and 100 mm or less, preferably 5 mm or more 100 mm or less, more preferably 10 mm or more and 80 mm or less, still more preferably more than 10 mm and 60 mm or less, particularly preferably 15 mm or more and 60 mm or less, and most preferably 15 mm or more and less than 50 mm. Distribution of the fiber length may be single, and may be a combination of two kinds or more.

In a preferred cutting method of carbon fibers described hereinafter, in the case of manufacturing a random mat by cutting carbon fibers in a fixed length, the average fiber length is nearly equal to the fiber length of the cut fibers.

The carbon fibers included in the random mat are preferred in that a composite material having excellent strength as well as being lightweight can be provided. The carbon fibers may be included alone, and may be included with a glass fiber or an aramid fiber therein for the purpose of, for example, imparting impact resistance. Preferred examples of the carbon fibers include carbon fibers in which polyacrylonitrile is a precursor (hereinafter sometimes referred to as polyacrylonitrile type carbon fibers or PAN-based carbon fibers). In the case of carbon fibers, the average fiber diameter is preferably from 3 to 12 μm, more preferably from 5 to 9 μm, and still more preferably from 5 to 7 μm.

The random mat may include other reinforcing fibers such as glass fibers, or organic fibers such as polyester fibers or aramid fibers, in a range that does not impair the object of the present invention (for example, a ratio of 20 wt % or less of the whole amount).

In general, in the case of applying a tensile load to a composite material obtained by using a random mat including containing carbon fibers opened to a single fiber level, load to which one fiber is applied is small. Therefore, if the fiber length is several mm, the carbon fibers is not substantially pulled out of the matrix resin until the carbon fibers finally break even though adhesion strength between the matrix resin and the carbon fiber is not so high. However, it becomes difficult to increase fiber volume content as the content of single fibers increases.

The random mat of the present invention makes it possible to increase fiber volume content by the form that a certain extent of fiber bundles remains in carbon fibers. However, load to which one fiber bundle is applied generally increases by including many fiber bundles. For this reason, in the case of applying tensile load to a composite material, fibers are pulled out of the matrix resin and the composite material breaks before breaking fibers. As a result, tensile strength of the composite material becomes low value. In the present invention, by impregnating the carbon fiber bundles with a resin into the inside thereof while controlling a thickness of carbon fiber bundles, a random mat having high tensile strength can be obtained in a random mat including a large number of carbon fiber bundles.

In the present invention, a random mat having higher tensile strength can be obtained by setting adhesion strength between the carbon fibers and the matrix to a specific range.

The adhesion strength between the carbon fibers and the matrix can be evaluated by a strand tensile shear test described hereinafter, and the strength in the strand tensile shear test is preferably 5 MPa or more. The strength in the strand tensile shear test is more preferably 15 MPa or more, still more 20 MPa or more, particularly preferably 30 MPa or more, and most preferably 40 MPa or more. The upper limit of the adhesion strength is not particularly limited, but is substantially about 60 MPa.

By setting the adhesion strength between the carbon fibers and the matrix resin to a specific range, carbon fibers can be reduced from being pulled out of the matrix resin, and the random mat having high tensile strength can be provided.

The means for setting the adhesion strength between the carbon fibers and the matrix resin that constitute the random mat to a specific range includes modification of the carbon fibers, in addition to selection of the matrix resin. Specific examples of the modification of the carbon fibers preferably include a method of changing a surface oxygen concentration ratio (O/C) of carbon fibers, and a method of giving a sizing agent to carbon fibers to increase adhesion strength between carbon fibers and a matrix resin (sizing treatment). By setting the adhesion strength between the carbon fibers and the matrix to a specific range, the carbon fibers are prevented from being pulled out of the matrix resin, making it possible to break the fibers, and as a result, both fiber volume content and tensile strength can be compatible.

The method for changing a surface oxygen concentration ratio (O/C) of carbon fibers is not particularly limited, but a method of passing electric current in an electrolyte such as an ammonium sulfate is preferred. The O/C range is preferably more than 10% and less than 40%, and more preferably more than 15% and less than 35%. When the O/C range is more than 10% and less than 40%, sufficient adhesion strength between carbon fibers and a matrix resin can be obtained, and the problem that strength of carbon fibers is decreased by excessive surface treatment and strength of a random mat and a composite material formed therefrom are also decreased can be avoided.

The sizing treatment method is preferably a method of dipping carbon fibers in solution in which a resin is dispersed in water or a solvent, and then drying is preferred. The kind of the resin used as a sizing agent is not particularly limited, but the resin preferably has compatibility with the matrix resin and preferably is the same kind of a resin as the matrix resin. Examples of the sizing agent include a polyamide resin, a polyester resin, a polycarbonate resin and an epoxy resin. The sizing agent preferably includes a resin having the same main chain structure as the main chain of the matrix resin, as a main component. In the case where the matrix resin is a polyamide resin (for example, nylon), the sizing agent preferably includes a polyamide resin having the same main chain structure as the main chain of the nylon, as a main component. In the case where the matrix resin is a polyester resin (for example, polybutylene terephthalate (PBT)), the sizing agent preferably includes a polyester resin having the same main chain structure as the main chain of the PBT, as a main component. In the case where the matrix resin is a polycarbonate resin (for example, polycarbonate (PC) in which bisphenol A is a bisphenol component), the sizing agent preferably includes a polycarbonate resin or an epoxy resin, having the same main chain structure as the main chain of the PC, as a main component. The main component used herein means that the amount thereof is 50% by weight or more, more preferably 75% by weight or more, and most preferably 100% by weight, based on the weight of the whole sizing agent.

The adhesion amount of the sizing agent is preferably more than 0% by weight and 10% by weight or less, more preferably more than 0.1% by weight and less than 10% by weight, and still more preferably more than 0.2% by weight and less than 8% by weight, based on the weight of the carbon fibers.

Degree of Opening

In the random mat of the present invention, a ratio of the carbon fiber bundles (A) constituted by the carbon fibers of the critical number of single fiber or more being defined by the following formula (1) to the total amount of fibers in the mat is 20 Vol % or more and 99 Vol % or less (volume %). As carbon fibers other than the carbon fiber bundles (A), the carbon fibers in a single fiber form and fiber bundles constituted by the carbon fibers of less than the critical number of single fiber are present in the mat:

$$\text{Critical number of single fiber} = 600/D \tag{1}$$

wherein D is an average fiber diameter (μm) of single carbon fibers.

In the random mat of the present invention, an amount of carbon fiber bundles constituted by the carbon fibers of the critical number of single fiber or more being defined by depending on an average fiber diameter is 20 Vol % or more and 99 Vol % or less. That is, the random mat of the present invention includes carbon fiber bundles including a specific number or more of carbon fibers by controlling the degree of opening of carbon fibers and other opened carbon fibers in a specific ratio. The amount of the carbon fiber bundles (A) can be controlled to a range of 20 Vol % or more and 99 Vol % or less by, for example, adjusting a pressure of air blown in the opening step. The preferred conditions are described in the item of an opening step.

Where the ratio of the carbon fiber bundles (A) to the total amount of fibers is less than 20 Vol %, it becomes difficult to obtain a fiber-reinforced composite material having high fiber volume content when a random mat is molded. On the other hand, where the ratio of the carbon fiber bundles (A) exceeds 99 Vol %, gaps of fibers are increased, and it becomes difficult to obtain a composite material having excellent mechanical strength. The ratio of the carbon fiber bundles (A) is preferably 30 Vol % or more, more preferably 50 Vol % or more, and still more preferably 60 Vol % or more. On the other hand, the ratio of the carbon fiber bundles (A) is preferably less than 99 Vol %, more preferably less than 98 Vol %, and still more preferably less than 95 Vol %. The ratio of the carbon fiber bundles (A) is preferably that of the above numerical ranges, the lower limit is 80 Vol %, for example, 80 Vol % or more and 99 Vol % or less.

In the random mat of the present invention, the average number (N) of fibers in the carbon fiber bundles (A) constituted by the carbon fibers of the critical number of single fiber or more satisfies the following formula (2):

$$0.6 \times 10^4/D^2 < N < 1 \times 10^5/D^2 \tag{2}$$

wherein D is an average fiber diameter (μm) of single carbon fibers.

The average number (N) of fibers in the carbon fiber bundles (A) can be controlled to the above range by adjusting a size of carbon fiber bundles supplied to a cutting step, for example, width of a bundle or the number of fibers per width of a bundle, in the preferred production method described hereinafter. Specific examples include a method of widening a width of fiber bundles by opening or the like and supplying to a cutting step, and a method of providing a slitting step before a cutting step. The fiber bundles may be slit simultaneously with cutting. The preferred conditions are described in the items of an opening step and a cutting step. Specifically, in the case where the average fiber diameter of carbon fibers constituting the random mat is from 5 to 7 μm, the critical number of single fiber is from 86 to 120, and in the case where the average fiber diameter of the carbon fibers is 5 μm, the average number of fibers in the carbon fiber bundles is a range of from more than 240 and less than 4,000. Above all, the average number of fibers is preferably from 300 to 2,500, and more preferably from 400 to 1,600. In the case where the average fiber diameter of carbon fibers is 7 μm, the average number of fibers in the carbon fiber bundles is a range of from more than 122 and less than 2,040. Above all, the average number of fibers is preferably from 150 to 1,500, and more preferably from 200 to 800.

In the case where the average number (N) of fibers in the carbon fiber bundles (A) is $0.6 \times 10^4/D^2$ or less, it becomes difficult to obtain high fiber volume content (Vf). In the case where the average number (N) of fibers in the carbon fiber bundles (A) is $1 \times 10^5/D^2$ or more, a part having large thickness is locally formed, and this is liable to be a factor for formation of voids.

In the random mat of the present invention, the average number (N) of fibers in the carbon fiber bundles (A) constituted by the carbon fibers of the critical number of single fiber or more satisfies the following formula (4):

$$0.6 \times 10^4/D^2 < N < 6.0 \times 10^4/D^2 \tag{4}$$

wherein D is an average fiber diameter (μm) of single carbon fibers.

In the case where the average number (N) of fibers in the carbon fiber bundles (A) is less than $0.6 \times 10^4$, unevenness in thickness of the carbon fiber mat constituting a random mat becomes small, a fiber-reinforced composite material having excellent mechanical properties can be obtained even in small thickness.

The average number (N) of fibers in the carbon fiber bundles (A) is more preferably more than $0.6 \times 10^4/D^2$ and less than $5.0 \times 10^4/D^2$, and still more preferably more than $0.6 \times 10^4/D^2$ and less than $4.0 \times 10^4/D^2$. That is, the average number (N) satisfies the following formula (5):

$$0.6 \times 10^4/D^2 < N < 4.0 \times 10^4/D^2 \tag{5}$$

wherein D is an average fiber diameter (μm) of carbon fibers.

As a form of the carbon fiber bundles (A) in the random mat of the present invention, the ratio of the fiber bundles having a thickness of 100 μm or more is less than 3% based on the total number of the carbon fiber bundles (A). When the ratio of the fiber bundles having a thickness of 100 μm or more is less than 3%, the fiber bundles can be suitably impregnated with the resin into the inside thereof. The ratio of the fiber bundles having a thickness of 100 μm or more is more preferably less than 1%. The ratio of the carbon fiber bundles having a thickness of 100 μm or more can be controlled to less than 3% by, for example, widening the fibers used and using the fibers having small thickness. The preferred conditions are described in the item of an opening step.

In the random mat of the present invention, the average thickness of the carbon fiber bundles (A) is preferably 20 μm or more and less than 100 μm. When the average thickness of the carbon fiber bundles (A) is 20 μm or more and less than 100 μm, the carbon fiber bundles have a small size, impregnation property of the matrix resin is good, and development rate of physical properties of carbon fibers are excellent, which is preferred. The unevenness in thickness of the carbon fibers in the random mat can be decreased by controlling the average thickness of the carbon fiber bundles to decrease a size of carbon fiber bundles as described above, and this makes it possible to obtain a fiber-reinforced composite material having excellent mechanical properties even in small thickness. When the average thickness of the carbon fiber bundles (A) is less than 100 μm, a size of individual fiber bundles does not increase, the unevenness in thickness of fibers in the random mat does not increase, and the fiber bundles is easily impregnated with a resin into the inside thereof. As a result, a fiber-reinforced composite material having excellent mechanical properties can be obtained. When the average thickness of the carbon fiber bundles (A) is 20 μm or more, the matrix resin in a shaped product finally manufactured easily permeates in the inside of the carbon fiber bundles (A), and poor impregnation is difficult to occur. The range of the average thickness of the carbon fiber bundles (A) is more preferably from 20 to 95 μm, still more preferably from 25 to 90 μm, and still further preferably from 25 to 80 μm, particularly preferably from 25 to 75 μm, and most preferably from 30 to 60 μm.

Preferred specific method of setting the ratio of the carbon fiber bundles (A), the average number of fibers in the carbon fiber bundles (A) and the average thickness of the carbon fiber bundles (A) to the above ranges includes a method of controlling by adjusting a size of fiber bundles, such as width of a bundles or the number of fibers per width, supplied to a cutting step in a preferred manufacturing method described hereinafter. Specifically, the method includes a method of broadening a width of fiber bundles by widening or the like to decrease a thickness and supplying the fiber bundles to a cutting step, and a method of providing a slitting step before a cutting step. The fiber bundles may be slit simultaneously with cutting. The preferred method is described in the item of a cutting method. The method further including a method of using widened fibers as carbon fibers to be used is exemplified, and the preferred method is described in the item of a cutting step. Furthermore, the adjustment of the average number (N) of fibers in the above step can be further precisely conducted by using carbon fiber bundles having an appropriate amount of an appropriate sizing agent added thereto.

In the random mat of the present invention, it is preferred that unevenness in thickness is extremely small. Coefficient of variation CV (%) can be used as an index of the unevenness in thickness. The unevenness in thickness of the random mat can be evaluated by unevenness in thickness of the carbon fiber mat (the matrix resin is excluded from the random mat) constituting the random mat. One example of procedures to obtain CV (%) of the thickness of the carbon fiber mat constituting the random mat is described below.

A test piece having an appropriate size, for example, a square plate of 100×100 mm, is cut out of the carbon fiber mat. The test piece is placed in a sealable bag, and a pressure in the bag is reduced to −0.09 MPa or less. The test piece is marked in a lattice pattern at intervals of 10 mm from the outside of the bag, and the thickness is measured with a micrometer down to 1/1000 mm size. Twenty-five points in total of 5 rows×5 columns are measured. Thickness of the bag is subtracted from the thickness measured, an average value and a standard deviation are calculated, and a coefficient of variation CV (%) of the thickness of the carbon fibers can be calculated from the following formula (7).

$$\text{Coefficient of variation } CV \text{ (\%)=standard deviation/average value} \times 100 \qquad (7)$$

The degree of unevenness in thickness of the carbon fibers in the carbon fiber mat is maintained even in the degree of unevenness in thickness of carbon fibers in a fiber-reinforced composite material obtained by molding the random mat and a shaped product.

Matrix Resin

The matrix resin contained in the random mat of the present invention is not particularly limited, but a thermoplastic resin is preferred.

Kinds of the thermoplastic resin include vinyl chloride resin, vinylidene chloride resin, vinyl acetate resin, polyvinyl alcohol resin, polystyrene resin, acrylonitrile-styrene resin (AS resin), acrylonitrile-butadiene-styrene resin (ABS resin), acryl resin, methacryl resin, polyethylene resin, polypropylene resin, polyamide resin (for example, polyamide 6 resin, polyamide 11 resin, polyamide 12 resin, polyamide 46 resin, polyamide 66 resin and polyamide 610 resin), polyacetal resin, polycarbonate resin, polyester resin (polyethylene terephthalate resin, polyethylene naphthalate resin, polybutylene naphthalate resin and polybutylene terephthalate resin), polyarylate resin, polyphenylene ether resin, polyphenylene sulfide resin, polysufone resin, polyether sulfone resin, polyether ether ketone resin and polylactic resin.

Those resins can be used alone or mixtures of two kinds or more thereof.

The thermoplastic resin is preferably polyamide resin, polyester resin, polypropylene resin, polycarbonate resin or polyphenylene sulfide resin from the standpoints of heat resistance, impact resistance, weather resistance, chemical resistance, moldability, strength, cost and their balance.

The amount of the matrix resin in the random mat is a range of preferably from 10 to 800 parts by weight, more preferably from 20 to 300 parts by weight, still more preferably 20 to 200 parts by weight, still further preferably from 30 to 200 parts by weight, and still further more preferably 30 to 150 parts by weight, particularly preferably from 35 to 100 parts by weight, and most preferably from 50 to 100 parts by weight, per 100 parts by weight of the carbon fibers.

The relationship in amount between the carbon fibers and the thermoplastic resin can further be defined by the carbon fiber volume content (hereinafter sometimes referred to as Vf) defined by the following formula.

$$\text{Carbon fiber volume content (Vol \%)=100} \times [\text{volume of carbon fibers/(volume of carbon fibers+volume of thermoplastic resin)}]$$

The carbon fiber volume content (Vf) and the amount of the thermoplastic resin in part by weight per 100 parts by weight of the carbon fibers are converted using a density of the carbon fibers and a density of the thermoplastic resin.

The random mat of the present invention may contain additives such as various fiber-shaped of organic fibers or inorganic fibers, non-fiber-shaped fillers, flame retardant, UV resistant agent, pigment, release agent, softener, plasticizer and surfactant, in a range that the object of the present invention is not impaired.

Intermediate Base Material

The random mat of the present invention has constituent carbon fibers with a length of a range of from 3 mm or more and 100 mm or less and has the form that at least one of fiber bundles including the carbon fibers of less than the critical number of single fiber being defined by the formula (1) and a single fiber, and the carbon fiber bundles (A) constituted by the carbon fibers of the critical number of single fiber or more are present in combination. Therefore, the random mat further has the characteristic that formability is high. For this reason, the random mat is desirably used as a thermoplastic stampable sheet obtained by using a thermoplastic resin. The thermoplastic stampable sheet is preferably used as a base material (intermediate base material) for obtaining a fiber-reinforced composite material having a complicated shape.

A method for obtaining a thermoplastic stampable sheet includes a method of applying carbon fibers to obtain a random mat, layering the random mat with a film-shaped or molten-state thermoplastic resin, and heating and pressuring by press or the like, thereby obtaining a sheet. The thermoplastic stampable sheet can be obtained by applying fiberous and/or particulate thermoplastic resin simultaneously with carbon fibers to prepare a random mat including the thermoplastic resin and the carbon fibers, and similarly heating and pressurizing by press or the like. Preferred manufacturing method of the random mat is described hereinafter.

Manufacturing Method

Method for preferably obtaining the random mat of the present invention is described below. The random mat of the present invention is preferably obtained by the following steps 1 to 3.
1. Step of cutting carbon fiber bundles
2. Step of introducing the cut carbon fibers in a tube to open fiber bundles
3. Step of forming a random mat from the carbon fibers and a matrix resin Each step is described in detail below.

Cutting Step

Figure 2:
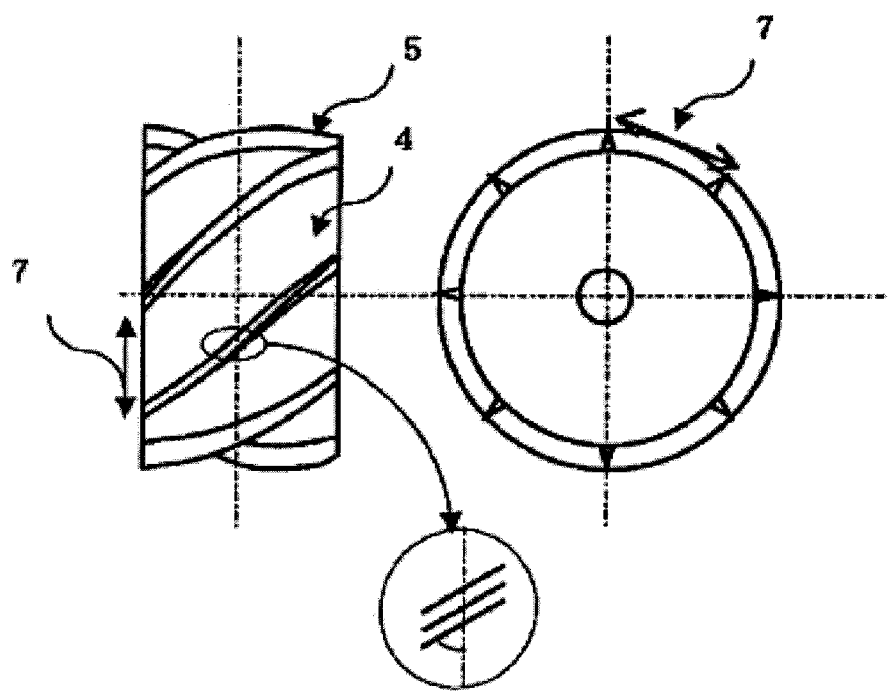
FIG. 2 is front and cross-sectional schematic views of a rotary separating cutter.
Figure 3:
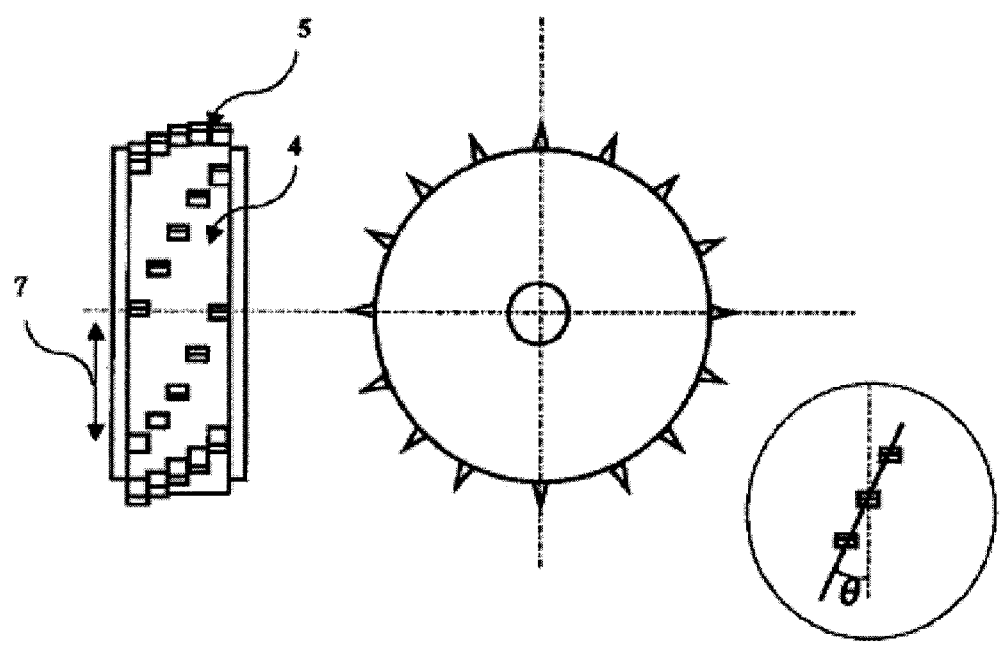
FIG. 3 is an explanatory view of a knife angle.

The cutting step of the carbon fibers is specifically a step of cutting carbon fibers using a knife. The knife used for cutting is preferably a rotary cutter or the like. The rotary cutter is preferably a cutter equipped with a spiral-shaped knife in which an angle is specified, or a so-called separating knife in which a large number of short blades are arranged. A specific schematic view of one example of the cutting step is shown in FIG. 1. One example of a rotary cutter having a spiral-shaped knife is shown in FIG. 2, and front and cross-sectional schematic views of one example of a rotary cutter having a separating knife, and an explanatory view of a knife angle are shown in FIG. 3. The rotary separating cutter is that a plurality of blades is arranged at even intervals and spirally along the main body.

To set the average number (N) of fibers in the carbon fiber bundles (A) to a preferred range in the present invention, it is preferred to control by adjusting a size of fiber bundles supplied to the cutting step, for example, a width of bundles and the number of fibers per width.

It is preferred to use fiber bundles in which the number of fiber bundles of carbon fibers previously falls within the range of the formula (2) as fiber bundles used for cutting. However, the cost of fibers generally becomes expensive as the number of fiber bundles is small. Therefore, in the case of using inexpensively available carbon fiber bundles having large number of fiber bundles, it is preferred to adjust a width of fiber bundles and the number of fibers per width, supplied to the cutting step, and then supplying to the cutting step. Specifically, it is exemplified a method of thinly broadening a width of fiber bundles by widening or the like and supplying the fiber bundles to a cutting step, and a method of providing a slitting step before the cutting step. In the method of providing a slitting step before a cutting step, the fiber bundles are, in advance, fined and then supplied to the cutting step. Therefore, a general flat blade, a spiral blade and the like which do not have a specific mechanism can be used as a cutter.

It can be exemplified a method of cutting fiber bundles using a separating knife, and a method of cutting fiber bundles using a cutter having a slit function and slitting at the same time.

In the case of using a separating knife, the average number (N) of fibers can be decreased by using a separating knife having narrow knife width, and the average number (N) of fibers can be increased by using a separating knife having large knife width.

Figure 4:
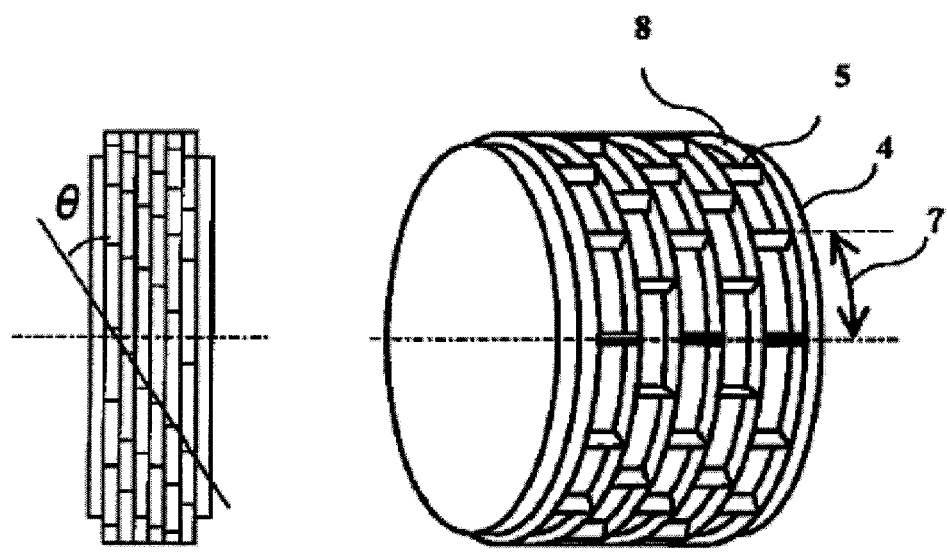
FIG. 4 is a schematic view of a cutter having blades parallel to a fiber direction.

As a cutter having slit function, an example of a separating cutter having blades parallel to a fiber direction in addition to blades perpendicular to a fiber direction is shown in FIG. 4. In the cutter of FIG. 4, short blades perpendicular to the fiber direction are arranged spirally at certain intervals. These blades can cut fibers, and at the same time, the fibers can be slit with the blades perpendicular to the fiber direction. As shown in the separating cutter of FIG. 4, an angle θ between a circumferential direction of the rotary cutter and an arrangement direction of knives is constant.

To obtain a random mat having excellent surface appearance, unevenness in fiber density is greatly affected. In a general rotary cutter in which flat blades are arranged, cutting of fibers is discontinuous, and in the case of successively introducing the fibers in an application step, unevenness occurs in fiber areal weight. For this reason, by continuously cutting fibers using a knife having a specified angle, application with small unevenness in fiber density becomes possible. Knife angle for continuously cutting carbon fibers is geometrically calculated by a width of carbon fibers used and a pitch of blades, and the relationship of those preferably satisfies the following formula (3). The pitch of blades in a circumferential direction is directly reflected to a fiber length of carbon fibers:

$$\text{Fiber length (blade pitch) of carbon fibers} = \text{carbon fiber strand width} \times \tan(90-\theta) \quad (3)$$

wherein θ is an angle between a circumferential direction and an arrangement direction of knives.

FIGS. 2 to 4 are examples of knives in which an angle is specified, and an angle θ between the circumferential direction and the arrangement direction of a knife in examples of those cutters is shown in the drawings.

By cutting fiber bundles while dividing the fiber bundles into finer bundles, homogeneity is improved and the fiber-reinforced composite material of the present invention is suitably obtained. The knife angle for continuously cutting carbon fibers is not particularly limited. General blade having 90° to fibers may be used and a blade having any angle to fibers may be used.

The random mat of the present invention is preferably that fiber bundles are small-size fiber bundles as described above. Therefore, it is preferred to use widened in advance carbon fibers or use strands having small thickness of fiber bundles by widening carbon fibers, and to supply those to a cutting step. In the present invention, broadening a width of fiber bundles to decrease a thickness is called widening.

A method for widening fibers is not particularly limited, and it can be exemplified a method of pushing an expanding spreader such as a convex pin to fibers, a method of passing air stream in a direction crossing to the conveying direction of fibers to warp fibers into an arc in a leeward direction, and a method of giving vibration.

To manufacture the random mat of the present invention, it is preferred to widen as the above and further separate into fiber bundles having smaller number of filaments. A method for separating fibers is not particularly limited, and it can be exemplified a method of making a strand a finer bundle with a slitter or the like. By using a sizing agent of carbon fibers and separating the carbon fibers, it is possible to easily obtain a random mat having the desired average number of fibers in the carbon fiber bundles.

By conducting fiber widening and then fiber separating, a size of carbon fiber bundles can be reduced, and thereby increasing the amount of fiber bundles. As a result, homogeneity of carbon fibers included in the random mat is improved and a random mat having small unevenness in thickness of a carbon fiber mat and excellent mechanical properties is obtained.

Opening Step

The opening step is a step of introducing cut carbon fibers in a tube and opening fiber bundles. Fiber bundles can be appropriately opened by blowing air to fibers. The degree of opening, the amount of carbon fiber bundles (A) and the average number (N) of fibers in the carbon fiber bundles (A) can be appropriately controlled by a pressure of air, or the like. In the opening step, the carbon fibers can be opened by preferably directly blowing air to fiber bundles in wind velocity of from 1 to 1,000 m/sec from a blowing hole of compressed air. The wind velocity is more preferably from 5 to 500 m/sec, and still more preferably from more than 50 to 500 m/sec. Specifically, holes having a diameter of from about 1 to 2 mm are formed on several places in a tube through which carbon fibers pass, a pressure of from 0.01 to 1.0 MPa, and more preferably from 0.2 to 0.8 MPa, is applied from the outside thereof, and compressed air is directly blown to fiber bundles. By decreasing wind velocity, it is possible to remain many fiber bundles, and by increasing wind velocity, fiber bundles can be opened up to a single fiber form.

Step for Forming Random Mat

The step for forming a random mat is a step of spreading carbon fibers cut and opened in air and simultaneously supplying a particulate or short fibrous matrix resin (hereinafter, those are referred to as "matrix resin particles and the like"), spraying the carbon fibers together with the matrix resin particles and the like on a breathable support provided below an opening apparatus, and depositing at a specific thickness and fixing on the support in the state that the carbon fibers and the matrix resin particles and the like are mixed so as to form a random mat. A thermoplastic resin is preferred as a matrix resin, and a particulate or short fibrous thermoplastic resin is referred to as "thermoplastic resin particles and the like".

In this step, the carbon fibers opened by a gas and the matrix resin particles and the like supplied from a separate pathway are sprayed on a breathable support at the same time, deposited on the breathable support in a mat form in a state that those are nearly uniformly mixed, and fixed in the state. In this case, when the breathable support is made from a conveyer constituted by a net, and the mixture is deposited on the conveyer while continuously moving the support in one direction, a random mat can be continuously formed. Furthermore, more uniform deposit may be achieved by moving the support from front to back and from side to side.

The carbon fibers and the matrix resin particles and the like are preferably sprayed so as to be two-dimensionally oriented. To conduct application while opened fibers are two-dimensionally oriented, it is preferred to use a taper tube having a conical shape enlarged toward a downstream side. In the taper tube, a gas blown to carbon fibers is diffused and flow rate in the tube is reduced. Therefore, at this time, rotational force is given to the carbon fibers. By utilizing the Venturi effect, the carbon fibers opened can be uniformly sprayed together with the matrix resin particles and the like without unevenness. Furthermore, for a fixing step described hereinafter, it is preferred to spray the carbon fibers on a movable breathable support (net conveyer or the like) having a suction mechanism at a lower part, and deposit in a random mat shape.

In this step, the amount of the matrix resin particles and the like supplied is preferably from 30 to 200 parts by weight per 100 parts by weight of the carbon fibers. The amount of the matrix resin particles and the like supplied is more preferably from 30 to 150 parts by weight, and still more preferably from 35 to 100 parts by weight, per 100 parts by weight of the carbon fibers.

The step for forming random mat includes a step of fixing the carbon fibers and the matrix resin particles and the like. That is, the fixing step is a step of fixing the deposited carbon fibers and matrix resin particles and the like. Preferably, the carbon fibers are fixed by suctioning air from a lower part of the breathable support. The matrix resin sprayed, at the same time, with the carbon fibers is fixed, while mixing, by air suction when the matrix resin is a fibrous form, and by accompanying the carbon fibers when the matrix resin is a particulate form.

Thus, a mat having high two-dimensional orientation can be obtained by suctioning from a lower part of the deposited surface. Furthermore, the matrix resin particle and the like can be suctioned using a negative pressure generated, and further can be easily mixed with the carbon fibers by diffusion flux generated in the tube. The random mat thus obtained makes it possible that the matrix resin particles and the like are uniformly present in gaps among and in the vicinity of the carbon fibers constituting the random mat. As a result, impregnation of the random mat with the resin can be made with a short movement distance of the resin and in relatively short period of time, in a heating impregnation pressurization step described hereinafter.

In a case where an opening of a sheet, a net or the like constituting the breathable support is small, when a part of the matrix resin particles and the like passes through the support and does not remain in the mat, to prevent this, it is possible to set a nonwoven fabric or the like on the surface of the support, spray the carbon fibers and matrix resin particles and the like on the nonwoven fabric, and fix them. In this case, if the nonwoven fabric is constituted by the same resin as the matrix resin particles and the like, it is not necessary to peel the nonwoven fabric from the mat deposited, and by heating and pressurizing the nonwoven fabric in a next step as it is, fibers constituting the nonwoven fabric can be utilized as a part of the matrix resin to be a matrix of a composite material.

In the manufacturing method of the random mat of the present invention, the random mat can be formed by cutting carbon fiber strands into a constant length, supplying the strand pieces and carbon fibers separated in a single fiber form when cutting to a transportation path for suction conveyance, blowing a gas to the carbon fibers from a gas blowing nozzle provided at the middle of the transportation path or at the end thereof, separating and opening the cut strand pieces into carbon fiber bundles having a desired size (diameter) and simultaneously blowing the carbon fibers to the surface of a breathable support (hereinafter sometimes referred to as a "fixing net") capable of continuously or intermittently moving in a constant direction together with the matrix resin particles and the like, followed by depositing and fixing. The transportation path is preferably constituted by a tube having flexibility such as a flexible tube or a hose, and a taper tube connected to the tip thereof. In this case, a gas blowing nozzle may be provided in a connecting part of the flexible tube and the taper tube, and in this case, it is preferred to open a supply passage of the matrix resin particles and the like on an inner wall of the taper tube.

Fiber-Reinforced Composite Material

The random mat of the present invention has an average fiber length of the constituent carbon fibers is from 3 mm or more and 100 mm or less, and has the form that at least one of the fiber bundles having the carbon fibers of less than a critical number of single fiber defined by the formula (1) and a single fiber, and the carbon fiber bundles (A) constituted by the carbon fibers of the critical number of single fiber or more are mixed. Therefore, local tearing of a mat is difficult to occur. Therefore, the fiber-reinforced composite material including the random mat obtained as above impregnated with a thermoplastic resin is preferably used in a cold press molding of heating a resin to its melting point or glass transition point or higher, and inserting the fiber-reinforced composite material in a mold keeping a temperature of a melting point or glass transition point of the resin or lower to obtain a shape, and is called a thermoplastic stampable sheet.

The fiber-reinforced composite material of the present invention has high fiber volume content and excellent tensile strength. The fiber volume content is preferably from 30 to 65%, and more preferably from 40 to 60%. The tensile strength of the fiber-reinforced composite material of the present invention is preferably 400 MPa or more, and more preferably 450 MPa or more. The upper limit of the tensile strength is not particularly limited, but is substantially 600 MPa.

A fiber-reinforced composite material can be obtained by molding the random mat of the present invention, and the present invention includes the fiber-reinforced composite material. The fiber-reinforced composite material of the present invention is constituted by carbon fibers having an average fiber length of from 3 to 100 mm and a matrix resin, and the carbon fibers contained preferably satisfy the following i) to iii).

i) The ratio of the carbon fiber bundles (A) constituted by the carbon fibers of the critical number of single fiber or more, defined by the formula (1) is 20 Vol % or more and 99 Vol % or less.

$$\text{Critical number of single fiber} = 600/D \qquad (1)$$

(wherein $D$ is an average fiber diameter (μm) of single carbon fibers).

ii) The average number (N) of fibers in the carbon fiber bundles (A) satisfies the following formula (2).

$$0.6 \times 10^4/D^2 < N < 1 \times 10^5/D^2 \qquad (2)$$

(wherein $D$ is an average fiber diameter (μm) of single carbon fibers).

iii) The average thickness of the carbon fiber bundles (A) is 20 μm or more and less than 100 μm.

The degree of opening of carbon fibers in the fiber-reinforced composite material maintains almost the state in the random mat. Regarding the carbon fibers in the fiber-reinforced composite material, in order to set the ratio of the carbon fiber bundles (A) and the average number (N) of fibers in the carbon fiber bundles (A) to the above ranges, those can be preferably adjusted to the respective ranges by controlling the ratio of the carbon fiber bundles (A) and the average number (N) of fibers in the carbon fiber bundles (A), in the random mat.

The thickness of the fiber-reinforced composite material is preferably adjusted to an appropriate range by controlling a fiber areal weight of the carbon fibers contained and the amount of the matrix resin.

The kind of the carbon fibers constituting the fiber-reinforced composite material is not particularly limited, and examples of the carbon fibers preferably include the carbon fibers described in the item of the carbon fibers of the random mat.

The kind of the resin constituting the fiber-reinforced composite material is not particularly limited, and examples of the resins preferably include the resins described in the item of the matrix resin of the random mat.

The amount of the matrix resin in the fiber-reinforced composite material is preferably from 10 to 800 parts by weight, more preferably from 20 to 300 parts by weight, still more preferably from 20 to 200 parts by weight, still further preferably from 30 to 150 parts by weight, and particularly preferably from 50 to 100 parts by weight, per 100 parts by weight of the carbon fibers, as described in the amount of the matrix resin in the random mat.

The fiber-reinforced composite material of the present invention can have various thicknesses, for example, a thickness of from 0.2 to 100 mm. Even a shaped product having smaller thickness can have extremely excellent properties and appearance. Specifically, a shaped plate can have a thickness of from 0.2 to 2.0 mm (a thickness at 25° C. if it is necessary to be extremely strictly defined). The fiber areal weight of the carbon fibers in the fiber-reinforced composite material is preferably from 25 to 10,000 g/m², more preferably from 50 to 4,000 g/m², and still more preferably from 600 to 2,200 g/m².

As described above, the fiber-reinforced composite material of the present invention has the form that carbon fiber bundles and single fibers are mixed, and the carbon fiber bundles are small-sized fiber bundles having a specific thickness. Therefore, unevenness in thickness of the carbon fibers in the fiber-reinforced composite material is extremely small. Coefficient of variation CV (%) can be used as an index of the unevenness in thickness. One example of procedures for obtaining CV (%) of the carbon fiber bundles (A) contained in the fiber-reinforced composite material is described below.

A test piece having an appropriate size, for example, 100 mm×100 mm, is cut out of a flat plate-like shaped product, and heated at 500° C. for about 1 hour in a furnace to remove the resin. A size and a weight of the test piece from which the resin was removed are measured, and the test piece is placed on a flat plate. The flat plate having the test piece thereon is inserted in a sealable bag, and the thicknesses at 25 places are measured by the procedures described in the measurement of unevenness in thickness of the carbon fibers in the random mat. Using a value of a net thickness of the test piece obtain by subtracting the thicknesses of the bag and the flat plate from the measurement value of the thickness, a coefficient of variation of the thickness of the carbon fibers in the fiber-reinforced composite material can be obtained by the formula (7). The coefficient of variation CV value defined by the formula (7) is preferably 20% or less, and more preferably 10% or less.

The degree of unevenness in thickness of the random mat is maintained in the degree of unevenness in thickness of the carbon fiber mat in the fiber-reinforced composite material.

Manufacturing of Shaped Product of Fiber-Reinforced Composite Material

The fiber-reinforced composite material can be obtained by molding the random mat. The method for obtaining the fiber-reinforced composite material includes a method of spraying carbon fibers to obtain a random mat, mixing the random mat with a film-shaped or molten matrix resin, and heating and pressuring it by a press or the like. The fiber-reinforced composite material can be also obtained by spraying a fibrous and/or particulate matrix resin together with the carbon fibers to form a random mat containing the matrix resin and the carbon fibers, and heating and pressuring the random mat by a press or the like. The method for obtaining the fiber-reinforced composite material is not particularly limited, but a shaped product can be preferably obtained by molding the fiber-reinforced composite material by, for example, vacuum forming, hydraulic forming, hot press or cold press. Above all, the fiber-reinforced composite material of the present invention is preferably obtained by cold press forming in which a random mat is heated to a melting point or glass transition temperature of the thermoplastic resin contained therein or higher, and then inserted in a mold keeping a temperature thereof to a melting point or glass transition temperature of the resin or lower to obtain a shape.

In the case of molding the random mat, when the thermoplastic resin as a matrix is crystalline, the thermoplastic resin is preferably heated to a melting point or higher, and when the thermoplastic resin is amorphous, the thermoplastic resin is preferably heated to a glass transition point or higher. A pressuring medium may be adjusted to a melting point or glass transition point of the thermoplastic resin as a matrix or higher, and may be adjusted to a melting point or glass transition point of the thermoplastic resin as a matrix or lower. In molding, fiber-reinforced composite materials having different thickness depending on the purpose can be obtained by appropriately adding the thermoplastic resin. The thermoplastic resin added is not particularly specified, and examples thereof include the same thermoplastic resins as described in the item of the matrix resin. The form of the resin can be a molten resin, a fibrous resin, a powdered resin, a film-like resin, and the like.

Furthermore, the fiber-reinforced composite material may be obtained by not directly molding the random mat, but forming an intermediate base material of a plate shape or the like, as it is called a prepreg, by heating and further pressuring, and then molding the prepreg by the above-described method.

EXAMPLES

Examples are described below, but the invention is not construed as being limited to those.

Unless otherwise indicated, regarding the carbon fiber bundles (A) and its samples, the unit of length of fiber bundle (fiber length) is mm, and the unit of weight is g. Density of a part of carbon fibers and thermoplastic resins used in examples and comparative examples is as follows.

PAN-based carbon fiber "TENAX" (registered trademark) STS40-24K: 1.75 g/cm$^3$
PAN-based carbon fiber "TENAX" (registered trademark) HTS40-12K: 1.76 g/cm$^3$
PAN-based carbon fiber "TENAX" (registered trademark) IMS40-12K: 1.76 g/cm$^3$
Polycarbonate: 1.20 g/cm$^3$
Polyamide 6: 1.14 g/cm$^3$
Polybutylene terephthalate: 1.31 g/cm$^3$ 1) Analysis of Carbon Fiber Bundles in Random Mat Random mat is cut into a size of about 100 mm×100 mm. All fiber bundles are taken out of the cut mat with tweezers, and the number (I) of bundles of the carbon fiber bundles (A), and length (Li) and weight (Wi) of fiber bundles are measured and recorded. Regarding fiber bundles are small to such an extent that the fiber bundles cannot be taken out of the mat with tweezers, those are collected, and its weight is finally measured (Wk). A balance measurable down to 1/100 mg is used for the measurement of weight. In the case where the fibers and the resin can be separated, only fibers are taken out with tweezers, and in the case where the fibers and the resin cannot be separated, the mat is heated at, for example, 500° C. for about 1 hour to remove the resin, and weight is measured. The critical number of single fiber is calculated from a fiber diameter (D) of carbon fibers used in the random mat, and the carbon fiber bundles (A) having carbon fibers of the critical number of single fiber or more and other carbon fiber bundles are separated to each other. In the case where two kinds or more of carbon fibers are used, the carbon fibers are separated every kind of fiber, and each kind of fiber is measured and evaluated.

The average number (N) of fibers in the carbon fiber bundles (A) is obtained as follows.

The number (Ni) of fibers in each carbon fiber bundle is obtained from a fineness (F (g/m)) of carbon fibers used by the following formula. As the fineness (F) uses a weight per length of a filament constituting the carbon fiber bundle is used.

$$Ni=Wi/(Li \times F)$$

The average number (N) of fibers in the carbon fiber bundles (A) is obtained from the number (I) of bundles in the carbon fiber bundles (A) by the following formula.

$$N=\Sigma Ni/I$$

The ratio (VR) of the carbon fiber bundles (A) to the total amount of fibers of the mat is obtained from the following formula by using a density ($\rho$(g/cm$^3$)) of carbon fibers.

$$VR=\Sigma(Wi/\rho)\times100/((Wk+\Sigma Wi)/\rho)$$

2) Analysis of Average Fiber Length of Carbon Fibers Contained in Random Mat or Composite Material Lengths of 100 carbon fibers randomly extracted from a random mat or a composite material were measured with a vernier caliper and a loupe down to a unit of 1 mm and recorded, and an average fiber length (La) was obtained by the following formula from lengths (Li) of all of the carbon fibers measured. In the case of the composite material, a resin was removed in a furnace at 500° C. for about 1 hour, and carbon fibers were then extracted.

$$La=\Sigma Li/100$$

3) Analysis of Fiber Bundle Thickness of Carbon Fibers Contained in Random Mat or Composite Material In the random mat, a thermosetting resin such as epoxy or a thermoplastic resin is impregnated to prepare a composite material.

An optional part of the composite material is cut using a diamond cutter or the like such that a cross-section of a fiber can be seen, and then polished to #5000 or more.

The polished surface is magnified by 200 times using an optical microscope, and thicknesses of all of bundles seen in a visual field are measured. The measurement is conducted in three visual fields each having a range of about 1.2 mm×1.6 mm.

The ratio (BR) of a bundle of 100 μm or more is obtained by the following formula.

$$BR=\text{number of bundles having thickness of 100 μm or more/total number of bundles observed}\times100$$

4) Analysis of Carbon Fiber Bundles in Composite Material

Regarding the composite material, after removing a resin at 500° C. for about 1 hour in a furnace, the measurement is conducted in the same manner as in the method in the random mat.

5) Analysis of Fiber Orientation in Composite Material

As a method for measuring isotropy of fibers after molding a composite material, a tensile test was conducted on the basis of an arbitrary direction on a shaped plate and a direction perpendicular to the arbitrary direction, tensile moduli thereof were measured, and a ratio (Eδ) obtained by dividing a large value of values of tensile modulus measured by a small value thereof was measured. Isotropy is excellent as the ratio of elastic modulus approaches 1.

Method for Obtaining Adhesion Strength Between Carbon Fibers and Matrix Resin The adhesion strength between the carbon fibers and the matrix resin is evaluated by tensile shear strength of a strand.

The matrix resin is heated to a melting point or higher and pressurized to prepare a film having a thickness of from about 30 to 50 μm.

Figure 5:
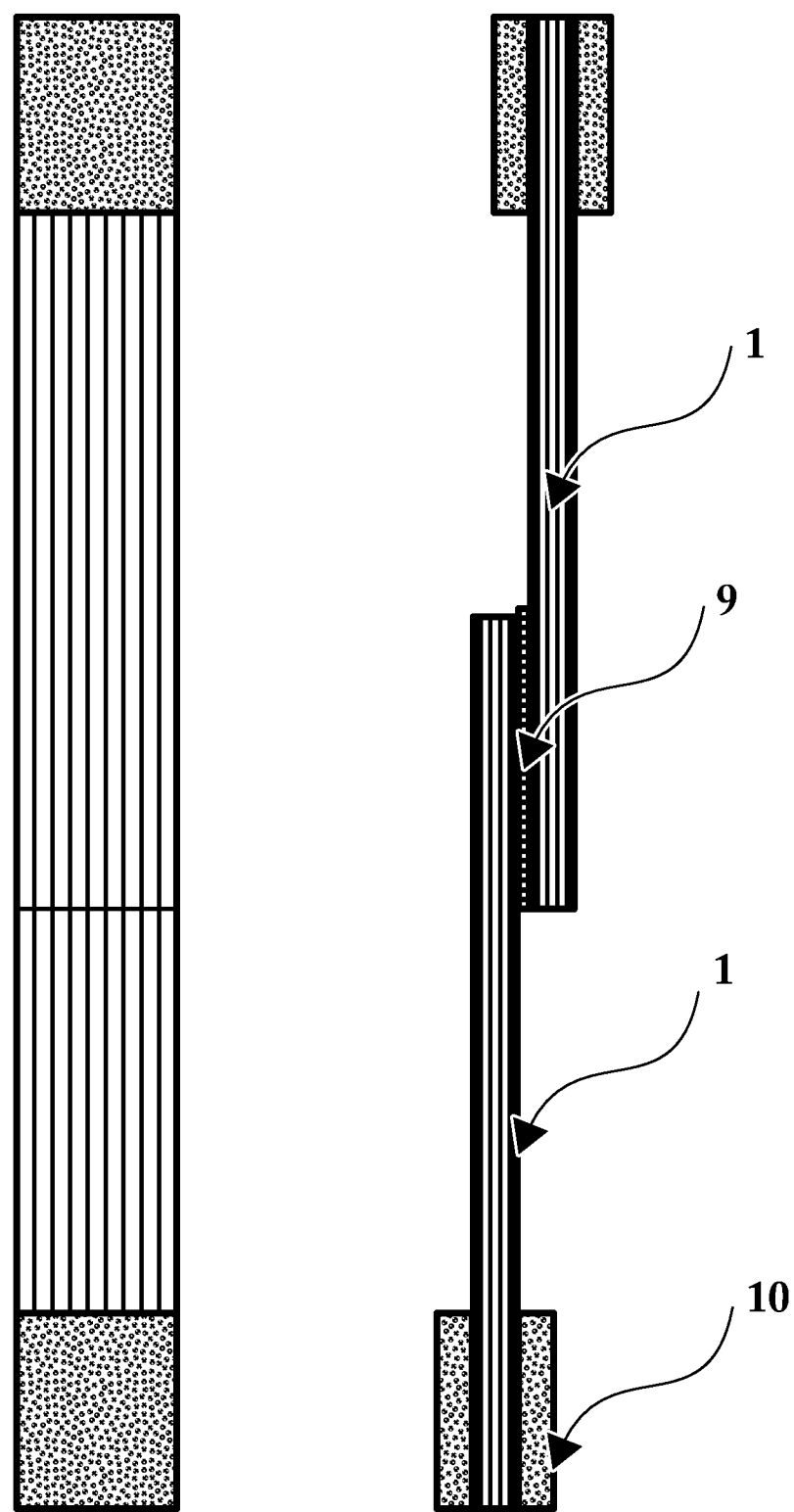
FIG. 5 is an explanatory view of an adhesion strength test.

Two surface-treated carbon fiber bundles having a specific length are prepared, and the film prepared above is placed between the two bundles and is adhered at a temperature of 260° C. over 2 minutes and 30 seconds in a length of an adhering part of 3 mm. The specific length means length of adhering part+50 mm. Both ends of a test piece including the carbon fiber bundles are sandwiched between two abrasive papers having a roughness of #320, respectively, to conduct anti-slip finishing (FIG. 5). This sample is used as a final test piece, tensile shear strength measurement is conducted based on JIS K6850:1999 using an autograph (AGS-X 5 kN, manufactured by Shimadzu Corporation) by applying a load in a test rate of 3 mm/min, and tensile strength at this time was measured. Seven samples were measured, and the average value thereof was defined as tensile shear strength.

Method for Obtaining Surface Oxygen Concentration O/C of Carbon Fibers

The surface oxygen concentration (O/C) of the carbon fibers can be obtained by XPS (ESCA) according to the following procedures. Fibers are cut, and then spread and arranged on a stainless sample support. Photoelectron escape angle is set to 90° C., MgKα is used as X-ray source, and the inside of a sample chamber is maintained in the vacuum of 1×10$^{-6}$ Pa. As the correction of a peak due to electrification during measuring, binding energy value B. E. of a main peak of C1s is set to 284.6 eV. O1s peak area is obtained by drawing a straight base line in a range of from 528 to 540 eV, and C1s peak area is obtained by drawing a straight base line in a range of from 282 to 292 eV. The surface oxygen concentration O/C on the surface of carbon fibers is obtained by calculating a ratio between the O1s peak area and C1s peak area.

Measurement of Thickness of Carbon Fiber Bundles (A) in Carbon Fiber Mat or Random Mat Average thickness of carbon fiber bundles (A) in the carbon fiber mat or random mat (hereinafter sometimes abbreviated as "random mat or the like") was measured by the following procedures.

1) A test piece of about 100 mm×100 mm is cut out of the random mat or the like, and about 20 fiber bundles are randomly taken out of the test piece by tweezers. The critical number of single fiber is calculated from the fiber diameter (D) of the carbon fibers used in the random mat or the like, and 20 carbon fiber bundles (A) constituted of carbon fibers of the critical number of fiber or more are extracted from the fiber bundles taken out.

2) Fiber bundle thickness of the carbon fiber bundles (A) constituted of the carbon fibers of the critical number of single fiber or more is measured using a thickness gauge measurable down to ¹⁄₁,₀₀₀ mm.

3) The above measurement is conducted at five times in the random mat or the like, and the average value thereof is obtained.

In the case where two kinds or more of carbon fibers are used, the carbon fibers are separated into every kind of fiber, and each kind of fiber is measured.

Thickness Measurement of Carbon Fiber Bundles (A) in Fiber-Reinforced Composite Material Average thickness of the carbon fiber bundles (A) in the fiber-reinforced composite material was measured by the following procedures.

1) The fiber-reinforced composite material is cut into a width of about 50 mm to prepare a test piece.

2) Cross-section of the test piece is observed with a microscope, and after confirming that a fiber axis of carbon fibers is approximately parallel to the cross-section, fiber bundle thickness of the carbon fiber bundles (A) constituted of the carbon fibers of the critical number of single fiber or more is measured in an area of 2.0 mm$^2$.

3) The measurement is conducted in 5 visual fields of the test piece, and the average value thereof is obtained.

In the case where two kinds or more of carbon fibers are used, the carbon fibers are separated into every kind of fiber, and each kind of fiber is measured.

Method for Obtaining Ratio of Carbon Fiber Bundles (A) to Total Amount of Carbon Fibers in Fiber-Reinforced Composite Material The ratio of the carbon fiber bundles (A) in the fiber-reinforced composite material is obtained as follows. A test piece of 100 mm×100 mm is cut out of the composite material, and heated in a furnace at 500° C. for about 1 hour in a furnace to remove a resin. The fiber bundles are taken out, and measured in the same procedures as in the random mat.

Measurement Method of Unevenness in Thickness of Carbon Fiber Mat in Random Mat or the Like Coefficient of variation CV of thickness of the carbon fiber mat in the random mat or the like was calculated in the following procedures, and unevenness in thickness was evaluated by CV. When variation in thickness of carbon fibers is large, the coefficient of variation CV (%) is large.

1) A test piece of 100 mm×100 mm is cut out of the carbon fiber mat, and placed in a sealable bag. Pressure in the bag is reduced to −0.09 MPa or less.

2) The test piece is marked with a lattice shape at intervals of 10 mm through the bag, and the thickness is measured with a micrometer down to 1/1000 mm size. Twenty-five points in total of 5 rows×5 columns are measured.

3) Thickness of the bag is subtracted from the thickness measured, an average value and a standard deviation are calculated, and the coefficient of variation CV of thickness of the carbon fibers only is calculated from the following formula.

$$\text{Coefficient of variation } CV \, (\%) = \text{standard deviation} / \text{average value} \times 100 \quad (7)$$

Measurement Method of Unevenness in Thickness of Carbon Fiber Mat in Fiber-Reinforced Composite Material In the case of evaluating unevenness in thickness of the carbon fiber mat in the fiber-reinforced composite material, a test piece of 100 mm×100 mm is cut out of a flat plate-shaped composite material, and heated at 500° C. for about 1 hour in a furnace to remove a resin. Thereafter, a size and a weight are similarly measured, and the test piece is placed on a smooth flat plate. Thereafter, the test piece together with the flat plate is inserted in a sealable bag, thicknesses at 25 places are measured in the same manner as in the procedures in the carbon fiber mat except for subtracting thicknesses of the bag and the flat plate from the thickness measured, and thus the coefficient of variation CV of thickness was obtained.

Evaluation of Degree of Impregnation of Fiber-Reinforced Composite Material

The degree of impregnation of the fiber-reinforced composite material was evaluated by conducting ultrasonic inspection in a frequency of a detector of 5 MHz and a scanning pitch of 2.0 mm×2.0 mm by an ultrasonic inspection imaging equipment (SDS-WIN, manufactured by Japan Krautkramer Co., Ltd.). In conducting the evaluation, a cross-section of a part of 90% or more of reflected wave intensity was observed with a microscope and it was confirmed that defects and pores are not present. In the ultrasonic inspection, the inside of the composite material is denser as the ratio of area of the portion having high reflected wave intensity (70% or more in this example) is higher, and it was defined that the degree of impregnation of a resin is high in the composite material. On the other hand, fine pores are present in the inside of the composite material as the ratio of area of the portion having low reflected wave intensity (50% or less in this example) is increased, and it was defined as many unimpregnated portions are present in the composite material.

Tensile Test

A test piece was cut out of the composite material using a water jet, and tensile strength and tensile modulus were measured using an universal tester manufactured by Instron by reference to JIS K7164 (2005).

Shape of the test piece was 1B type B-shaped test piece. Chuck distance was 115 mm, and test rate was 10 mm/min. Regarding the test piece, test pieces were cut out in an arbitrary direction (0° direction) of the composite material and a direction (90° direction) perpendicular to the optional direction of the composite material, respectively, and tensile strength and tensile modulus in the two direction were measured. Regarding the tensile strength, tensile strengths in the two directions were measured, and the average value thereof was obtained. Regarding the tensile modulus, a ratio (Eδ) was calculated by dividing a large value by a small value.

Example 1

Carbon fiber "TENAX" (registered trademark) STS40-24KS (fiber diameter: 7 μm, fiber width: 10 mm, tensile strength: 4,000 MPa) manufactured by Toho Tenax Co., Ltd. which was subjected to a surface treatment in the quantity of electricity of 27 coulombs per 1 g of carbon fiber using an ammonium sulfate aqueous solution as an electrolyte and then widened to a width of 30 mm was used as a carbon fiber. A slitter in which disk blades were prepared using a cemented carbide and arranged at intervals of 1 mm was used as a separating apparatus. A spiral rotary cutter having ah angle of 37° to a fiber and prepared using a cemented carbide was used as a cutting apparatus. Interval of the blades was 12 mm. A tube having small holes was prepared as an application apparatus, and compressed air was supplied using a compressor. In this case, wind velocity from the small holes was 100 m/sec. This tube was arranged just under the rotary cutter, and a taper tube was welded to the lower part thereof. A matrix resin was supplied from a side face of the taper tuber, and a powder obtained by freeze-pulverizing polycarbonate "PANLITE" (registered trademark) L-1225L pellets manufactured by Teijin Chemicals Ltd. and further classifying with 20 mesh and 30 mesh was used as a matrix resin. In this case, an average particle diameter was about 1 mm.

A table movable in XY direction was arranged in a lower part of the exit of the taper tube, and suction was conducted from the lower part of the table by a blower. The apparatus was operated, and a random mat having a carbon fiber areal weight of 1,800 g/m$^2$ and a polycarbonate resin areal weight of 1,500 g/m$^2$ was obtained. The random mat was heated with a press apparatus heated to 300° C. under 2.0 MPa for 5 minutes to obtain a shaped plate having a thickness (t) of 2.2 mm.

Regarding the composite material obtained, the critical number of single fiber defined by the formula (1) was 86, the average number (N) of single fibers in the carbon fiber bundles (A) constituted of the carbon fibers of the critical number of single fiber or more was 250, and the ratio of the carbon fiber bundles (A) constituted of the carbon fibers of the critical number of single fiber or more was 67 Vol %. The fiber volume content of the obtained composite material was 44 Vol %.

Test pieces (total 5 pieces, hereinafter, referred to as "n=5") having a size of 250 mm×25 mm were cut out of the shaped plate from 0° direction and 90° direction, and measured according to JIS K7164. As a result, the ratio Eδ of tensile modulus was 1.03 and the tensile strength was 470 MPa.

As a result of measuring the surface oxygen concentration O/C of the carbon fibers used, it was 25%. Furthermore, the average fiber length of carbon fibers in the random mat obtained was 12 mm, and fiber bundles having a thickness of 100 µm or more were not observed. As a result of measuring adhesion strength between the fibers used and the matrix resin used, it was 38 MPa.

In the shaped plate obtained, the average thickness of the carbon fiber bundles (A) was 32 µm, and as a result of evaluating unevenness in thickness of the carbon fiber mat in the shaped plate, the coefficient of variation CV of thickness was 8%.

Example 2

Carbon fiber "TENAX" (registered trademark) STS40-24KS (fiber diameter: 7 µm, fiber width: 10 mm, tensile strength: 4,000 MPa) manufactured by Toho Tenax Co., Ltd. was used as a carbon fiber. A sizing bath and a drying furnace were provided in a stage preceding the cutting step, and a sizing treatment was conducted. A sizing agent emulsion obtained by using a 6/66 binary copolyamide resin having a copolymerization ratio (weight ratio) of 90/10, adding 100 parts by weight of the copolyamide and 30 parts by weight of ANTOX EHD-PNA manufactured by Nippon Nyukazai Co., Ltd. as a surfactant to 4,000 parts by weight of water, followed by stirring was used. The temperature of the drying furnace was from 120° C. to 150° C., and the carbon fibers were passed through the drying furnace for 120 seconds.

Subsequently, the carbon fibers being subjected to the sizing treatment were widened to a width of 30 mm and were used. A slitter in which disk blades were prepared using a cemented carbide and arranged at intervals of 1 mm was used as a separating apparatus. A spiral rotary cutter having an angle of 37° to a fiber and prepared using a cemented carbide was used as a cutting apparatus. Interval of the blades was 12 mm. A tube having small holes was prepared as an application apparatus, and compressed air was supplied using a compressor. In this case, wind velocity from the small holes was 60 m/sec. This tube was arranged just under the rotary cutter, and a taper tube was welded to the lower part thereof. A matrix resin was supplied from a side face of the taper tuber, and a powder obtained by freeze-pulverizing nylon 6 resin A1030 manufactured by Unitika Ltd., and further classifying with 20 mesh and 30 mesh was used as the matrix resin. In this case, an average particle diameter was about 1 mm.

A table movable in XY direction was arranged in a lower part of the exit of the taper tube, and suction was conducted from the lower part of the table by a blower. The apparatus was operated, and a random mat having a carbon fiber areal weight of 1,800 g/m$^2$ and a nylon resin areal weight of 1,500 g/m$^2$ was obtained. The random mat was heated with a press apparatus heated to 260° C. under 2.0 MPa for 5 minutes to obtain a shaped plate having a thickness (t) of 2.3 mm.

Regarding the composite material obtained, the critical number of single fiber defined by the formula (1) was 86, the average number (N) of single fibers in the carbon fiber bundles (A) constituted of the carbon fibers of the critical number of single fiber or more was 420, and the ratio of the carbon fiber bundles (A) constituted of the carbon fibers the critical number of single fiber or more was 85 Vol %. The fiber volume content of the composite material obtained was 43 Vol %.

5 test pieces of 250×25 mm were cut out of the shaped plate from each of 0° direction and 90° direction, and measured according to JIS K7164. As a result, the ratio Eδ of tensile modulus was 1.02 and the tensile strength was 510 MPa.

Furthermore, the average fiber length of carbon fibers in the random mat obtained was 12 mm, and fiber bundles having a thickness of 100 µm or more were not observed. As a result of measuring adhesion strength between the fibers used and the matrix resin used, it was 50 MPa.

In the shaped plate obtained, the average thickness of the carbon fiber bundles (A) was 40 µm, and as a result of evaluating unevenness in thickness of the carbon fiber mat in the shaped plate, the coefficient of variation CV of thickness was 9%.

The adhesion amount of the sizing agent was 0.9% by weight based on the weight of the carbon fibers.

Example 3

Carbon fiber "TENAX" (registered trademark) HTS40-12KS (fiber diameter: 7 µm, fiber width: 9 mm, tensile strength: 4,000 MPa) manufactured by Toho Tenax Co., Ltd. was used as a carbon fiber. A sizing bath and a drying furnace were provided in a stage preceding the cutting step, and a sizing treatment was conducted. A sizing agent emulsion obtained by mixing under stirring 25 parts by weight of PBT resin (DURANEX manufactured by Polyplastics Co., Ltd.) and 15 parts by weight of bisphenol A type epoxy resin (EPIKOTE 1001 (registered trademark) manufactured by Japan Epoxy Resin Co.) as a sizing agent, adding 4,000 part by weight of water and further adding 30 parts by weight of ANTOX EHD-PNA manufactured by Nippon Nyukazai Co., Ltd. as a surfactant, followed by stirring was used. The temperature of the drying furnace was from 120° C. to 150° C., and the carbon fibers were passed through the drying furnace for 120 seconds.

A slitter in which disk blades were prepared using a cemented carbide and arranged at intervals of 1 mm was used as a separating apparatus. A spiral rotary cutter having an angle of 37° to a fiber and prepared using a cemented carbide was used as a cutting apparatus. Interval of the blades was 12 mm. A tube having small holes was prepared as an application apparatus, and compressed air was supplied using a compressor. In this case, wind velocity from the small holes was 100 m/sec. This tube was arranged just under the rotary cutter, and a taper tube was welded to the lower part thereof. A matrix resin was supplied from a side face of the taper tuber, and a powder obtained by freeze-pulverizing PBT resin DURANEX 2002 manufactured by Polyplastics Co., Ltd., and further classifying with 20 mesh and 30 mesh was used as a matrix resin. In this case, an average particle diameter was about 1 mm.

A table movable in XY direction was arranged in a lower part of the exit of the taper tube, and suction was conducted from the lower part of the table by a blower. The apparatus was operated, and a random mat having a carbon fiber areal weight of 1,600 g/m$^2$ and PBT resin areal weight of 1,400 g/m$^2$ was obtained. The random mat was heated with a press apparatus heated to 270° C. under 2.0 MPa for 5 minutes to obtain a shaped plate having a thickness (t) of 2.0 mm.

Regarding the composite material obtained, the critical number of single fiber defined by the formula (1) was 86, the average number (N) of single fibers in the carbon fiber bundles (A) constituted of the carbon fibers of the critical number of single fiber or more was 890, and the ratio of the carbon fiber bundles (A) constituted of the carbon fibers of the critical number of single fiber or more was 82 Vol %. The fiber volume content of the composite material obtained was 46 Vol %.

5 test pieces of 250×25 mm were cut out of the shaped plate from each of 0° direction and 90° direction, and measured according to JIS K7164. As a result, the ratio Eδ of tensile modulus was 1.02 and the tensile strength was 480 MPa.

Furthermore, the average fiber length of carbon fibers of the random mat obtained was 12 mm, and fiber bundles having a thickness of 100 μm or more were not observed. As a result of measuring adhesion strength between the fibers used and the matrix resin used, it was 46 MPa.

In the shaped plate obtained, the average thickness of the carbon fiber bundles (A) was 54 μm, and as a result of evaluating unevenness in thickness of the carbon fiber mat in the shaped plate, the coefficient of variation CV of thickness was 10%.

The adhesion amount of the sizing agent was 0.4% by weight based on the weight of the carbon fibers.

Example 4

Carbon fiber "TENAX" (registered trademark) HTS40-12KS (fiber diameter: 7 μm, fiber width: 9 mm, tensile strength: 4,000 MPa) manufactured by Toho Tenax Co., Ltd. was used as a carbon fiber. A random mat was obtained in the same manner as in Example 3, except that the surface treatment of the carbon fibers as in Example 1 was not conducted, a resin as a sizing treatment was not used and only water was used. The random mat obtained was dried at 120° C. for 15 minutes, and then heated with a press apparatus heated to 270° C. under 2.0 MPa for 5 minutes to obtain a shaped plate having a thickness (t) of 2.0 mm.

Regarding the composite material obtained, the critical number of single fiber defined by the formula (1) was 86, the average number (N) of single fibers in the carbon fiber bundles (A) constituted of the carbon fibers of the critical number of single fiber or more was 800, and the ratio of the carbon fiber bundles (A) constituted of the carbon fibers of the critical number of single fiber or more was 85 Vol %. The fiber volume content of the composite material obtained was 45 Vol %.

5 test pieces of 250×25 mm were cut out of the shaped plate from each of 0° direction and 90° direction every n=5, and measured according to JIS K7164. As a result, the ratio Eδ of tensile modulus was 1.02 and the tensile strength was 310 MPa.

Furthermore, the average fiber length of carbon fibers of the random mat obtained was 12 mm, and fiber bundles having a thickness of 100 μm or more were not observed. As a result of measuring adhesion strength between the fibers used and the matrix resin used, it was 16 MPa.

In the shaped plate obtained, the average thickness of the carbon fiber bundles (A) was 51 μm, and as a result of evaluating unevenness in thickness of the carbon fiber mat in the shaped plate, the coefficient of variation CV of thickness was 10%.

Because only water was used in the surface treatment, the adhesion amount of the sizing agent was 0% by weight based on the weight of the carbon fibers.

Example 5

PAN-based carbon fiber "TENAX" (registered trademark) STS40-24K (fiber diameter: 7 μm, fiber width: 10 mm, tensile strength: 4,000 MPa) manufactured by Toho Tenax Co., Ltd. was used as a carbon fiber. A sizing bath and a drying furnace were provided in a stage preceding the cutting step, and a sizing treatment was conducted. A sizing agent emulsion obtained by using a 6/66 binary copolyamide resin having a copolymerization ratio (weight ratio) of 90/10 as a sizing agent, adding 100 parts by weight of the copolyamide and 30 parts by weight of ANTOX EHD-PNA manufactured by Nippon Nyukazai Co., Ltd. as a surfactant to 4,000 parts by weight of water, followed by stirring was used. The temperature of the drying furnace was from 120° C. to 150° C., and the carbon fibers were passed through the drying furnace for 120 seconds.

The adhesion amount of the sizing agent was 0.8% by weight based on the weight of carbon fibers.

Subsequently, the carbon fibers being subjected to the sizing treatment were widened to a width of 30 mm and were used. A separating apparatus using a cemented carbide slits the carbon fibers at intervals of 0.6 mm. A rotary cutter having blades formed at the intervals of 20 mm and prepared using a cemented carbide was used as a cutting apparatus to cut the carbon fibers so as to have a fiber length of 20 mm. A taper tube was arranged just under the rotary cutter, and compressed air was supplied in a rate of 200 m/sec to convey the carbon fibers to the taper tube. A movable conveyer net was provided at a lower part of the exit of the taper tube, and carbon fibers were supplied while conducting suction by a blower at the lower part of the net to obtain a carbon fiber mat having a fiber areal weight of 640 g/m$^2$. As a result of observing the form of the carbon fibers in the carbon fiber mat, the fiber axis of the carbon fibers is almost parallel to the plane, and the carbon fibers were randomly dispersed in the plane. The average fiber length of the carbon fibers of the carbon fiber mat obtained was 20 mm. The critical number of single fiber defined by the formula (1) was 86, and the average thickness of the carbon fiber bundles (A) constituted of the carbon fibers of the critical number of single fiber or more was 40 μm. The average number (N) of single fibers in the carbon fiber bundles (A) constituted of the carbon fibers of the critical number of single fiber or more was 300, and the ratio of the carbon fiber bundles (A) constituted of the carbon fibers of the critical number of single fiber or more was 80 Vol %.

Eighteen polyamide 6 films (EMBLEM ON manufactured by Unitika Ltd., thickness: 25 μm) in total were layered on the upper and lower surfaces of the carbon fiber mat obtained to prepare the random mat of the present invention (matrix resin areal weight: 508 g/m$^2$). Thereafter, the random mat was heated with a press apparatus heated to 260° C. under 2.0 MPa for 10 minutes to obtain a shaped plate having a thickness of 0.8 mm. The shaped plate was subjected to an ultrasonic inspection test. As a result, a part having reflected wave intensity of 70% or more was observed in a ratio of 80% or more.

In the shaped plate obtained, the average thickness of the carbon fiber bundles (A) was 38 μm, and as a result of evaluating unevenness in thickness of the carbon fiber mat in the shaped plate, the coefficient of variation CV of thickness was 9%.

Furthermore, the carbon fiber volume content of the shaped plate obtained was 45 Vol %. As a result of the measurement of the shaped plate according to JIS 7164, the tensile strength was 520 MPa, and the development rate of physical property to theoretical strength was 77%. Furthermore, the tensile modulus ratio between 0° direction and 90° direction was 1.04. Fiber bundles having a thickness of 100 μm or more were not observed in the random mat obtained. As a result of measuring adhesion strength between the fibers used and the matrix resin used, it was 50 MPa.

Example 6

PAN-based carbon fiber "TENAX" (registered trademark) HTS40-12K (fiber diameter: 7 μm, fiber width: 6 mm, tensile strength: 4,200 MPa) manufactured by Toho Tenax Co., Ltd. was used as a carbon fiber. A sizing bath and a drying furnace were provided in a stage preceding the cutting step, and a sizing treatment was conducted. A sizing agent emulsion obtained by mixing under stirring 25 parts by weight of PBT resin (DURANEX manufactured by Polyplastics Co., Ltd.) and 15 parts by weight of bisphenol A type epoxy resin (EPIKOTE 1001 (registered trademark) manufactured by Japan Epoxy Resin Co.) as a sizing agent, adding 4,000 part by weight of water and further adding 30 parts by weight of ANTOX EHD-PNA manufactured by Nippon Nyukazai Co., Ltd. as a surfactant, followed by stirring was used. The temperature of the drying furnace was from 120° C. to 150° C., and the carbon fibers were passed through the drying furnace for 120 seconds.

The adhesion amount of the sizing agent was 0.6% by weight based on the weight of carbon fibers.

Subsequently, the carbon fibers being subjected to the sizing treatment were widened to a width of 20 mm and were used. A separating apparatus using a cemented carbide slits the carbon fibers at intervals of 1.5 mm. A rotary cutter having blades formed at the intervals of 20 mm and prepared using a cemented carbide was used as a cutting apparatus to cut the carbon fibers so as to have a fiber length of 20 mm. A taper tube was arranged just under the rotary cutter, and compressed air was supplied in a rate of 50 m/sec to convey the carbon fiber to the taper tube. A movable conveyer net was provided at a lower part of the exit of the taper tube, and carbon fibers were supplied while conducting suction by a blower at the lower part of the net to obtain a carbon fiber mat having a fiber areal weight of 1,900 g/m$^2$. As a result of observing the form of the carbon fibers in the carbon fiber mat, the fiber axis of the carbon fibers is almost parallel to the plane, and the carbon fibers were randomly dispersed in the plane. The average fiber length of the carbon fibers of the carbon fiber mat obtained was 40 mm. The critical number of single fiber defined by the formula (1) was 86, and the average thickness of the carbon fiber bundles (A) constituted of the carbon fibers of the critical number of single fiber or more was 37 μm. The average number (N) of single fibers in the carbon fiber bundles (A) constituted of the carbon fibers of the critical number of single fiber or more was 800, and the ratio of the carbon fiber bundles (A) constituted of the carbon fibers of the critical number of single fiber or more was 90 Vol %.

Polybutylene terephthalate (DURANAX (registered trademark) 500FP manufactured by WinTech Polymer Ltd.) was molded on the carbon fiber mat obtained, and thirty films in total each having a thickness of 30 μm were layered on the upper and lower surfaces of the carbon fiber mat to prepare the random mat of the present invention (matrix resin areal weight: 1,150 g/m$^2$). Thereafter, the random mat was heated with a press apparatus heated to 260° C. under 2.0 MPa for 10 minutes to obtain a shaped plate having a thickness of 2.0 mm. The shaped plate was subjected to an ultrasonic inspection test. As a result, a part having reflected wave intensity of 70% or more was observed in a ratio of 80% or more.

In the shaped plate obtained, the average thickness of the carbon fiber bundles (A) was 38 μm, and as a result of evaluating unevenness in thickness of the carbon fiber mat in the shaped plate, the coefficient of variation CV of thickness was 7%.

Furthermore, the carbon fiber volume content of the shaped plate obtained was 55 Vol %. As a result of the measurement of the shaped plate according to JIS 7164, the tensile strength was 600 MPa, and the development rate of physical property to theoretical strength was 72%. Furthermore, the tensile modulus ratio between 0° direction and 90° direction was 1.05. Fiber bundles having a thickness of 100 μm or more were not observed in the random mat obtained. As a result of measuring adhesion strength between the fibers used and the matrix resin used, it was 46 MPa.

Example 7

PAN-based carbon fiber "TENAX" (registered trademark) IMS40-12K (fiber diameter: 6.4 μm, fiber width: 6 mm, tensile strength: 4,700 MPa) manufactured by Toho Tenax Co., Ltd. was used as a carbon fiber. A sizing bath and a drying furnace were provided in a stage preceding the cutting step, and a sizing treatment was conducted. A sizing agent emulsion obtained by using a 6/66 binary copolyamide resin having a copolymerization ratio (weight ratio) of 90/10 as a sizing agent, adding 100 parts by weight of the copolyamide and 30 parts by weight of ANTOX EHD-PNA manufactured by Nippon Nyukazai Co., Ltd. as a surfactant to 4,000 parts by weight of water, followed by stirring was used. The temperature of the drying furnace was from 120 to 150° C., and the carbon fibers were passed through the drying furnace for 120 seconds.

The adhesion amount of the sizing agent is 1.0% by weight based on the weight of carbon fibers.

Subsequently, the carbon fibers being subjected to the sizing treatment were widened to a width of 20 mm and were used. A separating apparatus using a cemented carbide slits the carbon fibers at intervals of 1.0 mm. A rotary cutter having blades formed at the intervals of 10 mm and prepared using a cemented carbide was used as a cutting apparatus to cut the carbon fibers so as to have a fiber length of 10 mm.

A taper tube was arranged just under the rotary cutter, and compressed air was supplied in a rate of 200 m/sec to convey the carbon fibers to the taper tube. A movable conveyer net was provided at a lower part of the exit of the taper tube, and carbon fibers were supplied while conducting suction by a blower at the lower part of the net to obtain a carbon fiber mat having a fiber areal weight of 850 g/m$^2$ (matrix resin areal weight: 1,280 g/m$^2$). As a result of observing the form of the carbon fibers in the carbon fiber mat, the fiber axis of the carbon fibers is almost parallel to the plane, and the carbon fibers were randomly dispersed in the plane. The average fiber length of the carbon fibers of the carbon fiber mat obtained was 10 mm. The critical number of single fiber defined by the formula (1) was 94, and the average thickness of the carbon fiber bundles (A) constituted of the carbon fibers of the critical number of single fiber or more was 33 μm. The average number (N) of single fibers in the carbon fiber bundles (A) constituted of the carbon fibers of the critical number of single fiber or more was 600, and the ratio of the carbon fiber bundles (A) constituted of the carbon fibers of the critical number of single fiber or more was 70 Vol %.

Forty-five polyamide 6 films (EMBLEM ON manufactured by Unitika Ltd., thickness: 25 μm) in total were layered on the upper and lower surfaces of the carbon fiber mat obtained, and the resulting layered body was then heated with a press apparatus heated to 260° C. under 2.0 MPa for 10 minutes to obtain a shaped plate having a thickness of 1.6 mm. The shaped plate was subjected to an ultrasonic inspection test. As a result, a part having reflected wave intensity of 70% or more was observed in a ratio of 80% or more.

In the shaped plate obtained, the average thickness of the carbon fiber bundles (A) was 30 μm, and as a result of evaluating unevenness in thickness of the carbon fiber mat in the shaped plate, the coefficient of variation CV of thickness was 6%.

Furthermore, the carbon fiber volume content of the shaped plate obtained was 30 Vol %. As a result of the measurement of the shape plate according to JIS 7164, the tensile strength was 390 MPa, and the development rate of physical property to theoretical strength was 74%. Furthermore, the tensile modulus ratio between 0° direction and 90° direction was 1.04. Fiber bundles having a thickness of 100 μm or more were not observed in the random mat obtained. As a result of measuring adhesion strength between the fibers used and the matrix resin used, it was 50 MPa.

Example 8

PAN-based carbon fiber "TENAX" (registered trademark) STS40-24K (fiber diameter: 7 μm, fiber width: 10 mm, tensile strength: 4,000 MPa) manufactured by Toho Tenax Co., Ltd. was used as a carbon fiber. A sizing bath and a drying furnace were provided in a stage preceding the cutting step, and a sizing treatment was conducted. A sizing agent obtained by dissolving in water a resin composition containing 38% by weight of EP828 (bisphenol A type epoxy resin, manufactured by Mitsubishi Chemical Corporation), 45% by weight of EP1001 (bisphenol A type epoxy resin, manufactured by Mitsubishi Chemical Corporation) and 7% by weight of EPU6 (urethane-modified epoxy resin, manufactured by ADEKA Corporation), as epoxy resins, as a sizing agent, and 10% by weight of an octyl stearate (NJLUB OS, manufactured by New Japan Chemical Co., Ltd.) emulsion was used.

The adhesion amount of the sizing agent was 1.2% by weight based on the weight of carbon fibers.

Subsequently, the carbon fibers being subjected to a sizing treatment were widened to a width of 30 mm and were used. A separating apparatus slit the carbon fibers at intervals of 0.8 mm by using a cemented carbide. A rotary cutter having blades formed at the intervals of 20 mm and prepared using a cemented carbide was used as a cutting apparatus to cut the carbon fibers so as to have a fiber length of 20 mm. A taper tube was arranged just under the rotary cutter, and compressed air was supplied in a rate of 150 m/sec to convey the carbon fibers to the taper tube. Polycarbonate powder (PANLITE (registered trademark) L-1225Y, manufactured by Teijin Chemicals Ltd.) pulverized and classified into 500 μm as a matrix resin was supplied from a side face of the taper tube. A movable conveyer net was provided at a lower part of the exit of the taper tube, and carbon fibers were supplied while conducting suction by a blower at the lower part of the net to obtain a carbon fiber mat having a fiber areal weight of 800 g/m$^2$ (matrix resin areal weight: 670 g/m$^2$). As a result of observing the form of the carbon fibers in the carbon fiber mat, the fiber axis of the carbon fibers is almost parallel to the plane, and the carbon fibers were randomly dispersed in the plane.

The average fiber length of the carbon fibers of the carbon fiber mat obtained was 20 mm. The critical number of single fiber defined by the formula (1) was 86, and the average thickness of the carbon fiber bundles (A) constituted of the carbon fibers of the critical number of single fiber or more was 43 μm. The average number (N) of single fibers in the carbon fiber bundles (A) constituted of the carbon fibers of the critical number of single fiber or more was 500, and the ratio of the carbon fiber bundles (A) constituted of the carbon fibers of the critical number of single fiber or more was 80 Vol %.

The random mat obtained was heated with a press apparatus heated to 300° C. under 2.0 MPa for 10 minutes to obtain a shaped plate having a thickness of 1.0 mm. The shaped plate obtained was subjected to an ultrasonic inspection test. As a result, a part having reflected wave intensity of 70% or more was observed in a ratio of 80% or more.

In the shaped plate obtained, the average thickness of the carbon fiber bundles (A) was 41 μm, and as a result of evaluating unevenness in thickness of the carbon fiber mat in the shaped plate, the coefficient of variation CV of thickness was 9%.

Furthermore, the carbon fiber volume content of the shaped plate obtained was 45 Vol %. As a result of the measurement of the shaped plate according to JIS 7164, the tensile strength was 505 MPa, and the development rate of physical property to theoretical strength was 74%. Furthermore, the tensile modulus ratio between 0° direction and 90° direction was 1.05. Fiber bundles having a thickness of 100 μm or more were not observed in the random mat obtained. As a result of measuring adhesion strength between the fibers used and the matrix resin used, it was 38 MPa.

Comparative Example 1

PAN-based carbon fiber "TENAX" (registered trademark) STS40-24K (fiber diameter: 7 μm, fiber width: 10 mm, tensile strength: 4,000 MPa) manufactured by Toho Tenax Co., Ltd. was used as a carbon fiber. A sizing bath and a drying furnace were provided in a stage preceding the cutting step, and a sizing treatment was conducted. A sizing agent emulsion obtained by using a 6/66 binary copolyamide resin having a copolymerization ratio (weight ratio) of 90/10 as a sizing agent, adding 100 parts by weight of the copolyamide and 30 parts by weight of ANTOX EHD-PNA manufactured by Nippon Nyukazai Co., Ltd. as a surfactant to 4,000 parts by weight of water, followed by stirring was used. The temperature of the drying furnace was from 120° C. to 150° C., and the carbon fibers were passed through the drying furnace for 120 seconds.

The adhesion amount of the sizing agent was 0.9% by weight based on the weight of carbon fibers.

Subsequently, the carbon fibers being subjected to the sizing treatment were widened to a width of 12 mm and were used. A separating apparatus using a cemented carbide slits the carbon fibers at intervals of 1.0 mm. A rotary cutter having blades formed at the intervals of 20 mm and prepared using a cemented carbide was used as a cutting apparatus to cut the carbon fibers so as to have a fiber length of 20 mm. A taper tube was arranged just under the rotary cutter, and compressed air was supplied in a rate of 100 m/sec to convey the carbon fibers to the taper tube. A movable conveyer net was provided at a lower part of the exit of the taper tube, and carbon fibers were supplied while conducting suction by a blower at the lower part of the net to obtain a carbon fiber mat having a fiber areal weight of 640 g/m². As a result of observing the form of the carbon fibers in the carbon fiber mat, the fiber axis of the carbon fibers is almost parallel to the plane, and the carbon fibers were randomly dispersed in the plane. The average fiber length of the carbon fibers of the carbon fiber mat was 20 mm. The critical number of single fiber defined by the formula (1) was 86, and the average thickness of the carbon fiber bundles (A) constituted of the carbon fibers of the critical number of single fiber was 100 μm. The average number (N) of single fibers in the carbon fiber bundles (A) constituted of the carbon fibers of the critical number of single fiber or more was 1,500, and the ratio of the carbon fiber bundles (A) constituted of the carbon fibers of the critical number of single fiber or more was 80 Vol %.

Eighteen polyamide 6 films (EMBLEM ON manufactured by Unitika Ltd., thickness: 25 μm) in total were layered on the upper and lower surfaces of the carbon fiber mat obtained to prepare the random mat (matrix resin areal weight: 508 g/m²). Thereafter, the random mat was heated with a press apparatus heated to 260° C. under 2.0 MPa for 10 minutes to obtain a shaped plate having a thickness of 0.8 mm. The shaped plate was subjected to an ultrasonic inspection test. As a result, a part having reflected wave intensity of 70% or more was observed in a ratio of 58%, and unimpregnated portion was confirmed.

As a result of evaluating unevenness in thickness of the carbon fiber mat in the shaped plate obtained, the coefficient of variation CV of thickness was 23%.

Furthermore, the carbon fiber volume content of the shaped plate obtained was 45 Vol %. As a result of the measurement of the shaped plate according to JIS 7164, the tensile strength was 390 MPa, and the development rate of physical property to theoretical strength was 58%. Furthermore, the tensile modulus ratio between 0° direction and 90° direction was 1.09. In the random mat obtained, the ratio of the carbon fiber bundles having a thickness of 100 μm or more was 45% of the number of the whole carbon fiber bundles (A). As a result of measuring adhesion strength between the fibers used and the matrix resin used, it was 50 MPa.

Example 9

PAN-based carbon fiber "TENAX" (registered trademark) IMS40-12K (fiber diameter: 6.4 μm, fiber width: 6 mm, tensile strength: 4,700 MPa) manufactured by Toho Tenax Co., Ltd. was used as a carbon fiber. A sizing bath and a drying furnace were provided in a stage preceding the cutting step, and a sizing treatment was conducted. A sizing agent emulsion obtained by using a 6/66 binary copolyamide resin having a copolymerization ratio (weight ratio) of 90/10 as a sizing agent, adding 100 parts by weight of the copolyamide and 30 parts by weight of ANTOX EHD-PNA manufactured by Nippon Nyukazai Co., Ltd. as a surfactant to 4,000 parts by weight of water, followed by stirring was used. The temperature of the drying furnace was from 120° C. to 150° C., and the carbon fibers were passed through the drying furnace for 120 seconds.

The adhesion amount of the sizing agent was 0.9% by weight based on the weight of carbon fibers.

Subsequently, the carbon fibers being subjected to a sizing treatment were widened to a width of 25 mm and were used. A separating apparatus slit the carbon fibers at intervals of 1.0 mm by using a cemented carbide. A rotary cutter having blades formed at the intervals of 10 mm and prepared using a cemented carbide was used as a cutting apparatus to cut the carbon fibers so as to have a fiber length of 10 mm. A taper tube was arranged just under the rotary cutter, and compressed air was supplied in a rate of 450 m/sec to convey the carbon fibers to the taper tube. A movable conveyer net was provided at a lower part of the exit of the taper tube, and carbon fibers were supplied while conducting suction by a blower at the lower part of the net to obtain a carbon fiber mat having a fiber areal weight of 850 g/m². As a result of observing the form of the carbon fibers in the carbon fiber mat, the fiber axis of the carbon fibers is almost parallel to the plane, and the carbon fibers were randomly dispersed in the plane. The average fiber length of the carbon fibers of the carbon fiber mat was 10 mm. The critical number of single fiber defined by the formula (1) was 94, and the average thickness of the carbon fiber bundles (A) constituted of the carbon fibers of the critical number of single fiber or more was 19 μm. The average number (N) of single fibers in the carbon fiber bundles (A) constituted of the carbon fibers of the critical number of single fiber or more was 220, and the ratio of the carbon fiber bundles (A) constituted of the carbon fibers of the critical number of single fiber or more was 30 Vol %.

Forty-five polyamide 6 films (EMBLEM ON manufactured by Unitika Ltd., thickness: 25 μm) in total were layered on the upper and lower surfaces of the carbon fiber mat obtained to prepare the random mat of the present invention (matrix resin areal weight: 1,280 g/m²). Thereafter, the random mat was heated with a press apparatus heated to 260° C. under 2.0 MPa for 10 minutes to obtain a shaped plate having a thickness of 1.8 mm. The shaped plate was subjected to an ultrasonic inspection test. As a result, a part having reflected wave intensity of 70% or more was observed in a ratio of 30%, and unimpregnated portion was confirmed.

In the shaped plate obtained, the average thickness of the carbon fiber bundles (A) was 19 μm, and as a result of evaluating unevenness in thickness of the carbon fiber mat in the shaped plate, the coefficient of variation CV of thickness was 6.0%.

Furthermore, the carbon fiber volume content of the shaped plate obtained was 27 Vol %. As a result of the measurement of the shaped plate according to JIS 7164, the tensile strength was 325 MPa, and the development rate of physical property to theoretical strength was 61%. Furthermore, the tensile modulus ratio between 0° direction and 90° direction was 1.04.

In the random mat obtained, carbon fiber bundles having a thickness of 100 μm of the carbon fiber bundles (A) were not observed. As a result of measuring adhesion strength between the fibers used and the matrix resin used, it was 50 MPa.

INDUSTRIAL APPLICABILITY

The random mat of the present invention is preferably used as a preform, and has strong adhesion between the carbon fibers and the matrix resin although containing many fiber bundles. From this fact, the random mat of the present invention is a random mat having high tensile strength. Furthermore, the fiber-reinforced composite material obtained from the random mat of the present invention has high fiber volume content and high tensile strength, and therefore can be used as various structural members such as an inner plate, an outer plate and a structural member of automobiles, and frames and housings of various electric products and machines.

Although the present invention has been described in detail and by reference to the specific embodiments, it is apparent to one skilled in the art that various modifications or changes can be made without departing the spirit and scope of the present invention.

This application is based on Japanese Patent Application No. 2012-018076 filed on Jan. 31, 2012 and Japanese Patent Application No. 2012-165872 filed on Jul. 26, 2012, the disclosures of which are incorporated herein by reference.

DESCRIPTION OF REFERENCE NUMERALS AND SIGNS

1 Carbon fiber
2 Pinch roller
3 Rubber roller
4 Rotary cutter main body
5 Blade
6 Cut carbon fiber
7 Pitch of blades
8 Blade parallel to fiber direction
9 Film
10 Abrasive paper

The invention claimed is:

1. A method of manufacturing a random mat that includes carbon fiber bundles and a matrix resin, the method comprising:
cutting carbon fiber strands into cut strand pieces;
introducing the cut strand pieces in a tube and blowing air to the cut strand pieces to open the cut strand pieces into carbon fiber bundles including
at least one of
fiber bundles including single carbon fibers of less than a critical number of single fiber being defined by the following formula (1) and
a single carbon fiber, and
carbon fiber bundles (A) constituted by single carbon fibers of the critical number of single fiber or more; and
forming a random mat of the carbon fiber bundles and a matrix resin
wherein
the carbon fiber bundles in the random mat have an average fiber length in a range of 3 mm to 100 mm,
a fiber areal weight of the carbon fiber bundles is 25 to 10,000 g/m$^2$,
a ratio of the carbon fiber bundles (A) to a total amount of the carbon fiber bundles in the random mat is a range of 20 Vol % to 99 Vol %,
an average number (N) of single carbon fibers in the carbon fiber bundles (A) satisfies the following formula (2), and
a ratio of carbon fiber bundles having a thickness of 100 μm or more of the carbon fiber bundles (A) is less than 3% of the number of whole carbon fiber bundles (A):

$$\text{Critical number of single fiber} = 600/D \tag{1}$$

$$0.6 \times 10^4/D^2 < N < 1 \times 10^5/D^2 \tag{2}$$

wherein D is an average fiber diameter (μm) of carbon fibers.

2. The method according to claim 1,
wherein the carbon fiber bundles (A) have an average fiber thickness of 20 μm or more and less than 100 μm.

3. The method according to claim 1,
wherein adhesion strength between the carbon fiber bundles and the matrix resin evaluated by a strand tensile shear test is 30 MPa or more and 60 MPa or less.

4. The method according to claim 1,
wherein the matrix resin is a thermoplastic resin.

5. The method according to claim 1,
wherein an amount of the matrix resin in the random mat is 10 to 800 parts by weight per 100 parts by weight of the carbon fiber bundles.

6. The method according to claim 1,
wherein a sizing agent is applied to the carbon fiber bundles, the sizing agent containing a resin having compatibility with the matrix resin as a main component.

7. The method according to claim 1,
wherein the carbon fiber bundles have a surface oxygen concentration ratio O/C of more than 10% and less than 40%.

8. The method according to claim 1,
wherein the forming of a random mat includes: layering a carbon fiber mat with a film-shaped or molten-sate thermoplastic resin, the carbon fiber mat being obtained by applying the opened carbon fiber bundles; and heating and pressurizing the carbon fiber mat with the thermoplastic resin.

9. The method according to claim 1,
wherein the forming of a random mat includes: spreading the opened carbon fiber bundles in air and simultaneously supplying a particulate or short fibrous matrix resin; spraying the carbon fiber bundles together with the matrix resin on a breathable support provided below an opening apparatus; and depositing and fixing the carbon fiber bundles and the matrix resin at a thickness on the support in a state that the carbon fiber bundles and the matrix resin are mixed.

10. The method according to claim 1,
wherein the cutting of carbon fiber strands is performed after widening and separating the carbon fiber strands.

* * * * *